United States Patent
Ferrari et al.

(10) Patent No.: US 7,640,674 B2
(45) Date of Patent: Jan. 5, 2010

(54) SYSTEMS AND METHODS FOR CALIBRATING A PORTABLE COORDINATE MEASUREMENT MACHINE

(75) Inventors: Paul Ferrari, Carlsbad, CA (US); Homer Eaton, Carlsbad, CA (US)

(73) Assignee: Hexagon Metrology, Inc., Norcross, GA (US)

( * ) Notice: Subject to any disclaimer, the term of this patent is extended or adjusted under 35 U.S.C. 154(b) by 50 days.

(21) Appl. No.: 12/115,504

(22) Filed: May 5, 2008

(65) Prior Publication Data
US 2009/0271996 A1    Nov. 5, 2009

(51) Int. Cl.
*G01B 5/004* (2006.01)
*G01B 5/012* (2006.01)

(52) U.S. Cl. .............................. 33/502; 33/503; 33/559

(58) Field of Classification Search .................... 33/502, 33/503, 559, 560, 561
See application file for complete search history.

(56) References Cited

U.S. PATENT DOCUMENTS

| | | | |
|---|---|---|---|
| 4,932,136 A * | 6/1990 | Schmitz et al. ................ 33/502 |
| 5,084,981 A | 2/1992 | McMurtry et al. |
| 5,088,337 A | 2/1992 | Bennett |
| 5,148,377 A | 9/1992 | McDonald |
| 5,187,874 A | 2/1993 | Takahashi et al. |
| 5,189,797 A | 3/1993 | Granger |
| 5,345,690 A * | 9/1994 | McMurtry et al. ............ 33/559 |
| 5,396,712 A | 3/1995 | Herzog |
| 5,408,754 A | 4/1995 | Raab |
| 5,412,880 A | 5/1995 | Raab |
| 5,505,003 A | 4/1996 | Evans et al. |
| 5,510,977 A | 4/1996 | Raab |
| 5,521,847 A | 5/1996 | Ostrowski et al. |
| 5,528,505 A | 6/1996 | Granger et al. |
| 5,611,147 A | 3/1997 | Raab |
| 5,615,489 A | 4/1997 | Breyer et al. |
| 5,757,499 A | 5/1998 | Eaton |
| 5,768,792 A * | 6/1998 | Raab .......................... 33/503 |
| 5,813,128 A * | 9/1998 | Bailey ......................... 33/502 |
| 5,822,450 A | 10/1998 | Arakawa et al. |
| 5,829,148 A * | 11/1998 | Eaton .......................... 33/503 |
| 5,978,748 A | 11/1999 | Raab |
| 5,991,704 A | 11/1999 | Rekar et al. |
| 6,023,850 A * | 2/2000 | Trapet ........................ 33/502 |
| 6,134,506 A | 10/2000 | Rosenberg et al. |

(Continued)

FOREIGN PATENT DOCUMENTS

DE    4345091 A1    7/1995

(Continued)

*Primary Examiner*—G. Bradley Bennett
(74) *Attorney, Agent, or Firm*—Knobbe, Martens, Olson & Bear LLP

(57) ABSTRACT

An articulated arm portable coordinate measurement machine (PCMM) can be calibrated or recalibrated using a coordinate measurement machine (CMM). In one method for PCMM calibration, the CMM can be moved to one position, and the PCMM moved to a contact position where a probe head of the PCMM contacts a probe head of the PCMM. The PCMM and the CMM can be operatively coupled, for example, by a synchronizing cable such that position data from the PCMM and the CMM can be obtained at the contact position. The PCMM can be repositioned one or more times to obtain position data at multiple PCMM positions. The CMM can be repositioned as desired and additional contact position data sets obtained by subsequent positioning and repositioning of the PCMM. Various probe head types such as touch trigger probes, hard probes, and contact probes can be used in the calibration systems and methods.

20 Claims, 19 Drawing Sheets

U.S. PATENT DOCUMENTS

| | | |
|---|---|---|
| 6,161,079 A | 12/2000 | Zink et al. |
| 6,219,928 B1 | 4/2001 | Raab et al. |
| 6,366,831 B1 | 4/2002 | Raab |
| 6,519,860 B1 * | 2/2003 | Bieg et al. .................... 33/503 |
| 6,598,306 B2 | 7/2003 | Eaton |
| 6,611,346 B2 | 8/2003 | Granger |
| 6,611,617 B1 | 8/2003 | Crampton |
| 6,618,496 B1 * | 9/2003 | Tassakos et al. ............ 382/154 |
| 6,668,466 B1 | 12/2003 | Bieg et al. |
| 6,760,977 B2 * | 7/2004 | Jordil et al. .................... 33/558 |
| 6,817,108 B2 | 11/2004 | Eaton |
| 6,892,465 B2 | 5/2005 | Raab et al. |
| 6,904,691 B2 | 6/2005 | Raab et al. |
| 6,925,722 B2 | 8/2005 | Raab et al. |
| 6,931,745 B2 | 8/2005 | Granger |
| 6,952,882 B2 | 10/2005 | Raab et al. |
| 6,984,236 B2 | 1/2006 | Raab |
| 6,988,322 B2 | 1/2006 | Raab et al. |
| 7,003,892 B2 | 2/2006 | Eaton et al. |
| 7,017,275 B2 | 3/2006 | Raab et al. |
| 7,043,847 B2 | 5/2006 | Raab et al. |
| 7,051,450 B2 | 5/2006 | Raab et al. |
| 7,073,271 B2 | 7/2006 | Raab et al. |
| 7,152,456 B2 | 12/2006 | Eaton |
| 7,174,651 B2 | 2/2007 | Raab et al. |
| 7,246,030 B2 | 7/2007 | Raab et al. |
| 7,269,910 B2 | 9/2007 | Raab et al. |
| 7,296,979 B2 | 11/2007 | Raab et al. |
| 7,347,000 B2 * | 3/2008 | Jordil et al. .................... 33/561 |
| 7,372,581 B2 | 5/2008 | Raab et al. |
| 7,395,606 B2 | 7/2008 | Crampton |
| 2004/0083830 A1 * | 5/2004 | Nashiki et al. ................ 33/503 |
| 2007/0063500 A1 | 3/2007 | Eaton |

FOREIGN PATENT DOCUMENTS

| | | |
|---|---|---|
| DE | 101 12 977 | 11/2002 |
| EP | 0522610 A1 | 6/1992 |
| FR | 2740546 | 1/1998 |
| GB | 2274526 A | 7/1994 |
| JP | 404057690 | 2/1992 |
| JP | 04-032393 | 5/1992 |
| JP | 05-031685 | 2/1993 |
| JP | 2003-021133 | 1/2003 |
| JP | 2003/175484 | 9/2003 |
| JP | 2003275484 | 9/2003 |
| JP | 2006-214559 | 8/2006 |
| WO | WO 98/08050 | 2/1998 |

* cited by examiner

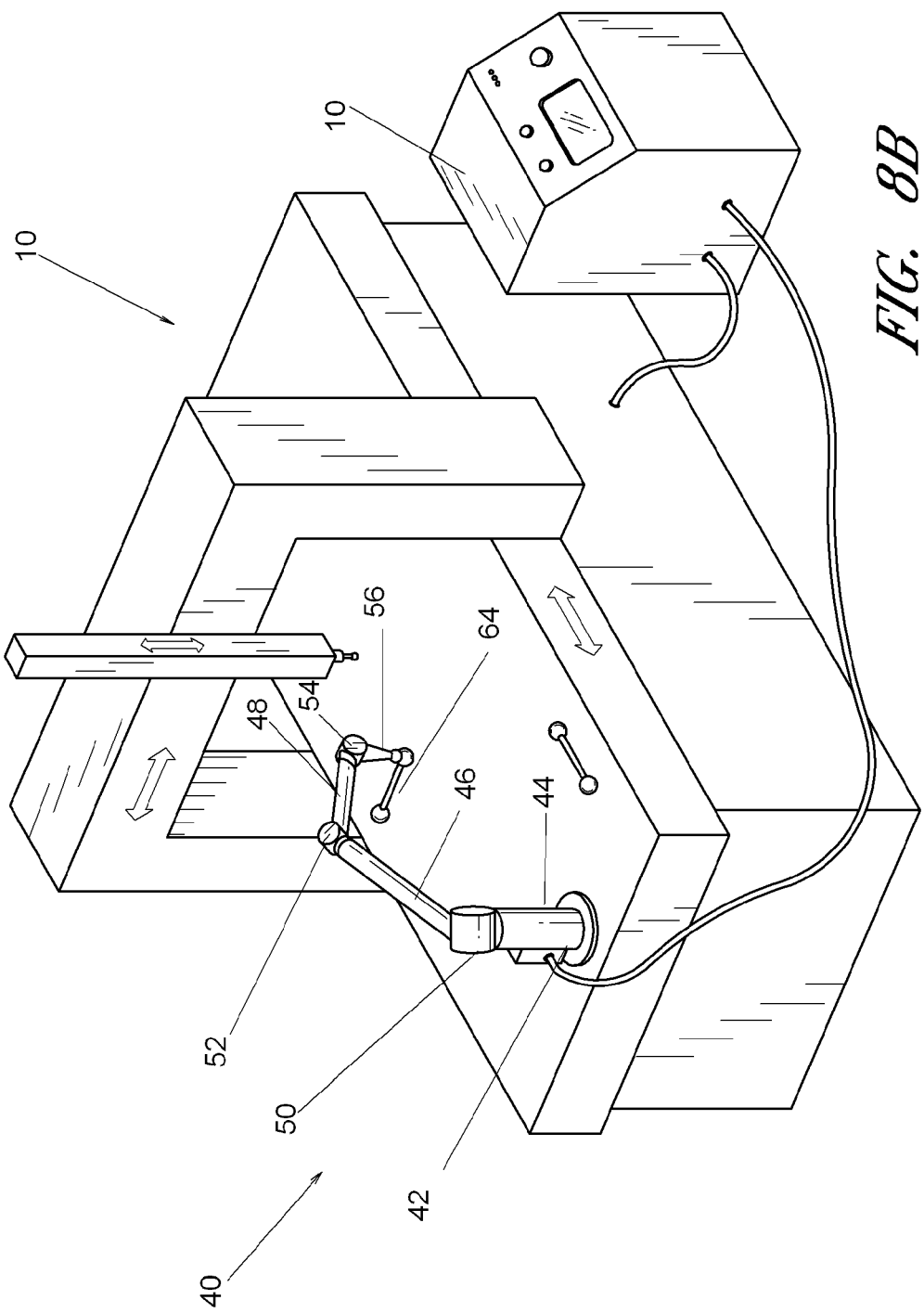

SYSTEMS AND METHODS FOR CALIBRATING A PORTABLE COORDINATE MEASUREMENT MACHINE

BACKGROUND OF THE INVENTION

1. Field of the Invention

The present application relates to measurement machines, more specifically to articulated arm portable coordinate measurement machines.

2. Description of the Related Art

Portable coordinate measurement machines (PCMMs) such as articulated arm PCMMs can be used to perform a variety of measurement and coordinate acquisition tasks. In one common commercially-available PCMM, an articulated arm having three transfer members connected by articulating joints allows easy movement of a probe head about seven axes to take various measurements. For optimal precision and accuracy of the measurements generated by a PCMM, it must initially be calibrated to account for any manufacturing variations in the components of the PCMM itself.

Previously, a portable coordinate measurement machine would be calibrated by using the PCMM to measure one or more length artifacts such as bars of precisely known dimensions. By using a PCMM to measure lengths of a length artifact having precisely known dimensions, position data obtained by the PCMM could be analyzed, and a PCMM processor and or position measuring device such as an analog or digital encoder calibrated to reflect the known measurements of the length artifact.

While the previous calibration process typically resulted in acceptable calibration results, it did have shortcomings. The prior PCMM calibration process can be expensive as the precision-manufactured length artifacts are difficult and costly to produce. This previous calibration process was also time consuming as the PCMM would need to be manually manipulated between various positions with respect to the length artifacts. The prior PCMM calibration process was also somewhat limited as only a relatively small number of position readings were typically taken. Also this process can be subject to some variation as even the precision-manufactured length artifacts are subject to some degree of length variation due to thermal expansion.

SUMMARY OF THE INVENTION

As described in further detail herein, systems and methods are disclosed overcoming the shortcomings of the prior art and having certain advantages. In light of the prior methods discussed above, there is a need for a relatively fast, reliable, inexpensive method of calibrating a PCMM.

In some embodiments, a method for calibrating a portable coordinate measurement machine having a probe is provided. The method comprises providing a coordinate measurement machine, positioning the coordinate measurement machine in a first calibration position; positioning the portable coordinate measurement machine in a first position; positioning the coordinate measurement machine in a second calibration position; and positioning the portable coordinate measurement machine in a second position. The coordinate measurement machine has a measurement probe. With the portable coordinate measurement machine in the first position, the probe contacts the measurement probe of the coordinate measurement machine in the first calibration position. With the portable coordinate measurement machine in the second position, the probe contacts the measurement probe of the coordinate measurement machine in the second calibration position.

In other embodiments, a system for calibrating a portable coordinate measurement machine is provided. The system comprises a coordinate measurement machine, a portable coordinate measurement machine, and a control unit operatively coupled to the coordinate measurement machine and the portable coordinate measurement machine.

In other embodiments, a contact probe for a coordinate measurement machine is provided. The contact probe comprises a plate, a first spherical portion extending from the plate, a second spherical portion extending from the plate, and a third spherical portion extending from the plate. The first, second, and third spherical portions are positioned to form a seat on the plate. The first, second, and third spherical portions are electrically coupled to one another such that simultaneous contact of the first, second, and third spherical portions completes a segment of an electrical circuit.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 8B is a schematic perspective view of the system of FIG. 1 in a fourth verification position;

DETAILED DESCRIPTION OF THE PREFERRED EMBODIMENTS

Figure 1:
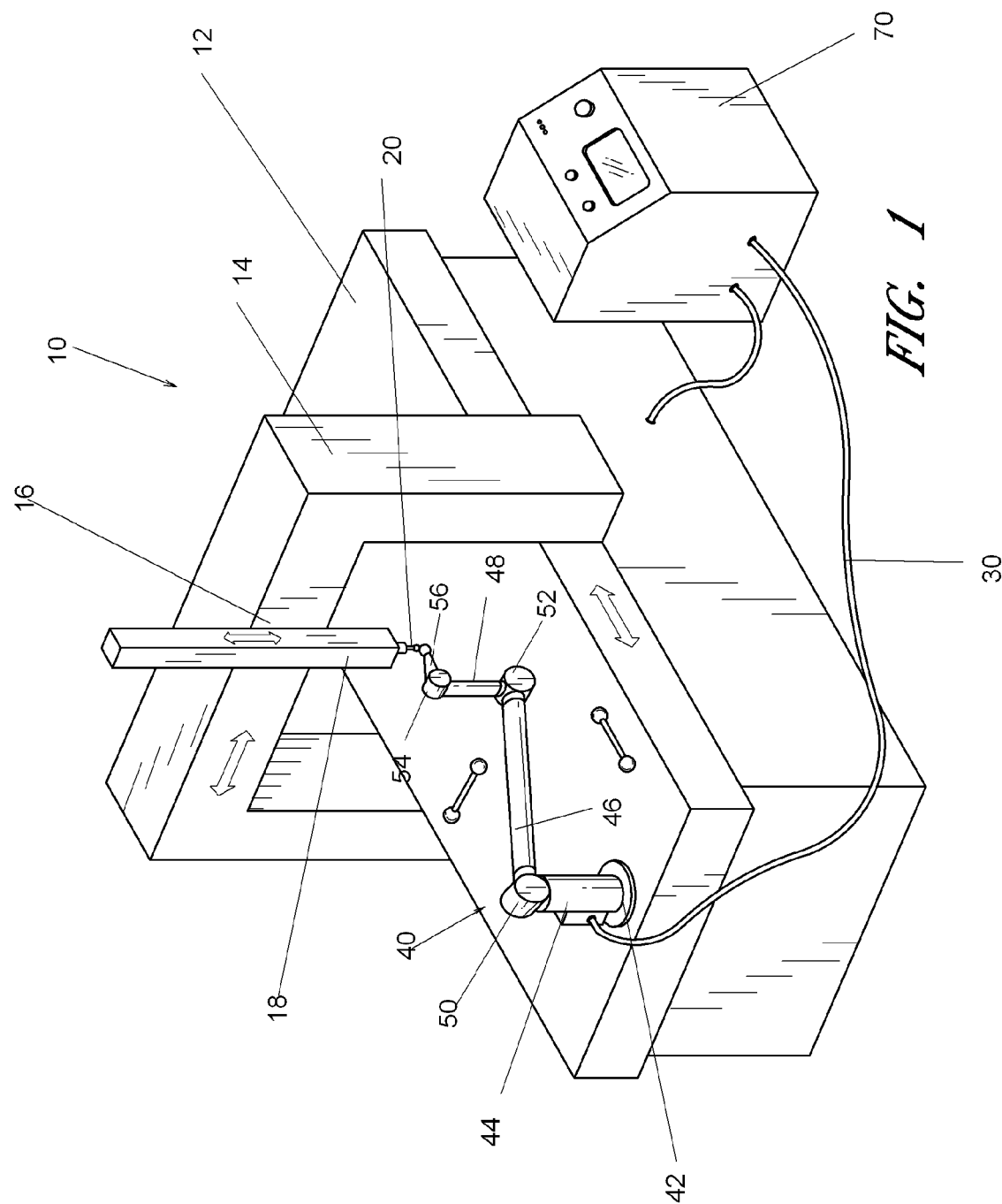
FIG. 1 is a schematic perspective view of a system for calibrating a PCMM in a first position.

Systems for Calibrating or Certifying a Portable Coordinate Measurement Machine With reference to FIGS. 1-6 a system for calibrating and/or certifying a portable coordinate measurement machine is illustrated. In various embodiments, the system can include a coordinate measurement machine (CMM) 10 and a portable coordinate measurement machine (PCMM) 40 operatively coupled to one another. In some embodiments, a synchronizing cable or sync cable 30 can be used to operatively couple the PCMM to the CMM.

Coordinate Measurement Machine (CMM)

With reference to FIGS. 1-6, a coordinate measurement machine 10 can include a worktable 12, a portal 14, a support 16, a sleeve 18, and a probe tip 20. Desirably, the worktable 12 is a substantially level, planar surface, and in some embodiments can be a granite or slate surface. The portal 14 can include two uprights spanned by a support beam. The support 16 can be positioned on the support beam, and can support the sleeve 18. The sleeve 18 can have a probe tip 20 positioned at an end thereof.

In some embodiments, the probe tip 20 of the CMM can be moved in one or more axes, such as manually or via electric, pneumatic, or hydraulic actuators to position the probe tip 20 in a desired position. In some embodiments, the CMM can have three axes, for example, the portal 14 can be translatable with respect to the worktable along a first axis, the support 16 can be translatable with respect to the support beam along a second axis, and the sleeve 18 can be translatable with respect to the support 16 along a third axis. Between the sleeve 18 and the probe tip 20 can be a probe head which is used to articulate the probe tip 20 relative to the sleeve 18. In other embodiments, the order and orientation of the axes may vary, for example, in some embodiments the support may travel vertically and the sleeve horizontally. The CMM may also have a rotary axis that the portable CMM rotates about In some embodiments, the CMM 10 can be operatively coupled to a processor 70 that can include a CMM controller configured to actuate the CMM to a desired position in a three-dimensional space reference frame. The position of the CMM in each axis can be determined by measuring transducers such as linear encoder, which may be of the type optical, magnetic, laser, or any other type of transducer which can provide absolute or relative position. The processor 70 can also be configured to determine a position of the probe tip within three dimensional space. For example, the position of the probe tip 20 can be measured with respect to an (x,y,z) coordinate system where x, y, and z represent orthogonal axes defining a three-dimensional space. As is known in the art, the position of each of the portal 14, the support 16, the sleeve 18 using a dedicated transducer. Each transducer can output a signal (e.g., an electrical signal), which can vary according to the movement of the corresponding member (i.e., the portal 14, the support 16, the sleeve 18). The signal can be carried through wires or otherwise transmitted to the processor 70. From there, the signal can be processed and/or transferred to a computer for determining the position of the probe tip 20 in space. Thus, the probe tip 20 of a CMM can be used to perform various measuring operations.

As further discussed in more detail below, various types of the probe tip 20 can be used in a CMM. For example, in some embodiments, the probe tip 20 of the CMM can be a touch trigger probe or other electronic switching probe, in other embodiments the probe tip 20 can comprise a hard probe.

The CMM 10 is schematically illustrated herein. However it is contemplated that in various embodiments, a variety of CMMs can be used in the systems and methods described herein. In some embodiments of the systems and methods described herein, a Brown & Sharpe® CMM, such as a CMM from the Brown & Sharpe® Global product line. In other embodiments, other CMMs can be used in the systems and methods disclosed herein.

Portable Coordinate Measurement Machine

With continued reference to FIGS. 1-6, a portable coordinate measurement machine (PCMM) 40 can be an articulated arm comprising a plurality of transfer members 44, 46, 48 connected by articulating joints 50, 52, 54 to allow the arm to be movably positioned in many different orientations. At one end, a transfer member is coupled to a base 42. The base 42 can be positioned and secured on the worktable 12 of the CMM 10. In some embodiments, the base 42 can be positioned on a rotatable table or elevatable surface on the worktable 12 of the CMM 10. At an opposite end, the transfer member 48 is coupled to a probe head 56. The base 42 can include a PCMM processor configured to calculate a position of the probe head 56 in space based on lengths of the transfer members 44, 46, 48 and relative positions of the articulating joints 50, 52, 54.

In one embodiment, each articulating joint 50, 52, 54 provides for both swiveling and pivoting moment between adjacent transfer members 44, 46, 48. With respect to each degree of movement, the position of each of the articulation members articulating joints 50, 52, 54 can be measured using a dedicated rotational transducers. As with the CMM 10, Each transducer can output a signal (e.g., an electrical signal), which can vary according to the movement of the joint 50, 52, 54. The signal can be carried through wires or otherwise transmitted to the base 42 of the PCMM 40. From there, the signal can be processed and/or transferred to a computer for determining the position of the probe 56 in space. In some embodiments of PCMM 40, the rotational transducer for each of the joints 50, 52, 54 can comprise an optical encoder.

As described in further detail below, various types of probe heads 56 can be used in systems and methods described herein. For example, in some embodiments, the probe head 56 of the PCMM can be a touch trigger probe or other electronic switching probe, in other embodiments the probe tip 20 can comprise a hard probe.

In some embodiments, the PCMM 40 can include articulating joints configured to allow infinite rotation of adjacent transfer members about an axis of rotation. In other embodiments, the PCMM can include one or more articulating joints configured to have stops defining limits of rotation of adjacent transfer members.

In the illustrated embodiment, the PCMM is illustrated schematically, although various PCMMs can be used in the systems and methods described herein. Various embodiments of PCMM are described in U.S. Pat. No. 5,829,148, entitled "Spatial Measuring Device", U.S. patent application Ser. No. 11/943,463, filed Nov. 20, 2007, entitled "Coordinate Measurement Device with Improved Joint", currently pending, U.S. patent application Ser. No. 11/963,531, filed Dec. 21, 2007, entitled "Improved Joint Axis for Coordinate Measurement Machine," currently pending, U.S. patent application Ser. No. 11/775,081, filed Jul. 9, 2007, entitled "Joint for Coordinate Measurement Device," currently pending, and U.S. patent application Ser. No. 11/864,392, filed Sep. 28, 2007, entitled "Coordinate Measurement Machine," currently pending and can be used in the systems and methods described herein. This patent and these patent applications are hereby incorporated herein by reference in their entireties.

In the illustrated embodiments, the PCMM 40 comprises three transfer members 44, 46, 48 and articulating joints 50, 52, 54 allowing movement about seven axes of rotation. In other embodiments, a PCMM can include more or fewer than three transfer members such as, for example two or four transfer members. Likewise, in other embodiments, corresponding more or fewer articulating joints 50, 52, 54 can allow movement about more or fewer than seven axes of rotation. In some embodiments the PCMM can have three transfer members as illustrated, but can have articulating joints 50, 52, 54 allowing movement about fewer than seven axes of rotation, for example, six axes of rotation.

Operative Coupling of the PCMM and CMM

With reference to FIGS. 1-6, the PCMM 40 can be operatively coupled to the CMM 10 such as with a synchronizing cable or sync cable 30. As described in further detail below, the sync cable 30 can be electrically coupled to the processor 70 and the CMM in one of several configurations to allow synchronization of probe head position data from the CMM and the PCMM.

While operative coupling between the CMM 10 and the PCMM 40 is illustrated as a wired connection over the sync cable 30, in other embodiments, other cabling or wireless transmission protocols can be used to operatively couple the CMM 10 and the PCMM 40.

Method for Calibrating a PCMM Using a CMM

With respect to FIGS. 1-6 various embodiments of method for calibrating a PCMM are illustrated. In general, the CMM 10 can be positioned at one or more positions while the PCMM can be positioned such that the probe head 56 of the PCMM 40 contacts the probe tip 20 of the CMM 10. In some embodiments, for each position of the CMM 10, the PCMM 40 can be repositioned in multiple contact positions. For each contact position, position data from the CMM 10 and the PCMM 40 can be obtained by the processor 70. With sufficient data collection, the PCMM 40 can be calibrated such that it accurately provides position data correlating to that generated by the CMM 10.

With reference to FIG. 1, a first contact position between the CMM 10 and the PCMM 40 is illustrated. In the illustrated contact position, the probe tip 20 of the CMM 10 can be positioned at a first position $(x_1, y_1, z_1)$ and the probe head 56 of the PCMM 40 can moved into a first position such that it contacts the probe tip 20 of the CMM. Contact between the two probe heads 20, 56 can trigger a synchronization signal to be sent over the sync cable 30 such that position data of the PCMM 40 and the CMM 10 is captured by the processor 70. That is, when the synchronization signal is sent, both the PCMM 40 and the CMM 10 at substantially the same time record the position of their respective probe heads 20, 56 by recording the position of the individual transducers and sending such data to the processor 70.

Figure 2:
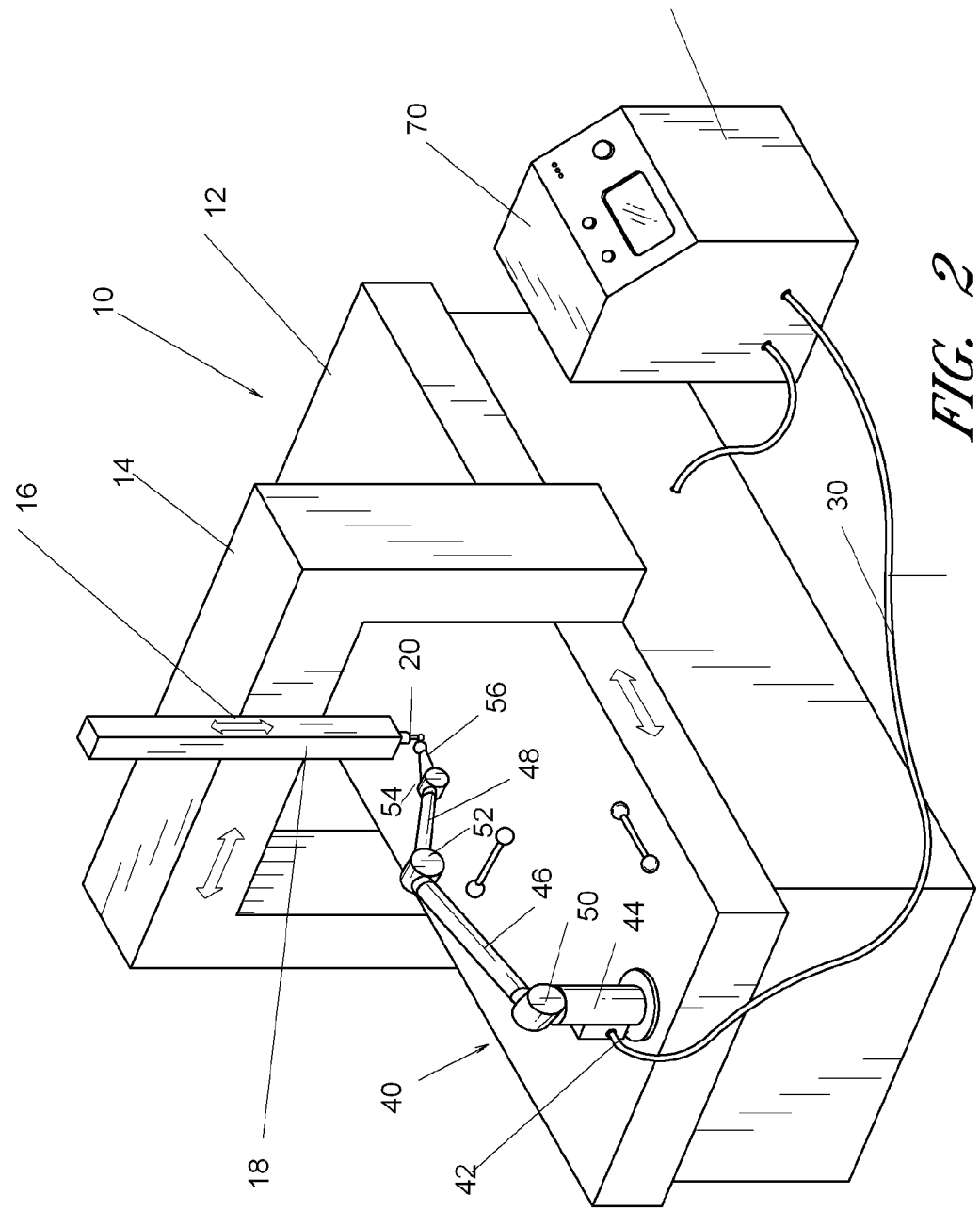
FIG. 2 is a schematic perspective view of the system of FIG. 1 in a second position.

With reference to FIG. 2, a second contact position between the CMM 10 and the PCMM 40 is illustrated. With the CMM 10 remaining in the first position $(x_1, y_1, z_1)$, the PCMM 40 can then be moved to a second position such that the probe head 56 of the PCMM 56 contacts the probe tip 20 of the CMM 10. Desirably, at least one of the probe heads 56, 20 is configured to allow contact at multiple orientations, for example, one or both of the probe heads 56, 20 can include a substantially spherical contact section such that the probe head 56, 20 can contact a surface to be measured at various orientations. Accordingly, the PCMM can be positioned with the transfer members 44, 46, 48 at different orientations in the second contact position than in the first contact position, thus allowing calibration of the transducers, such as analog or digital encoders, in each of the articulating joints 50, 52, 54. Again, contact between the two probe heads 20, 56 can trigger a synchronization signal to be sent over the sync cable 30 such that position data of the PCMM 40 and the CMM 10 is captured by the processor 70.

Figure 3:
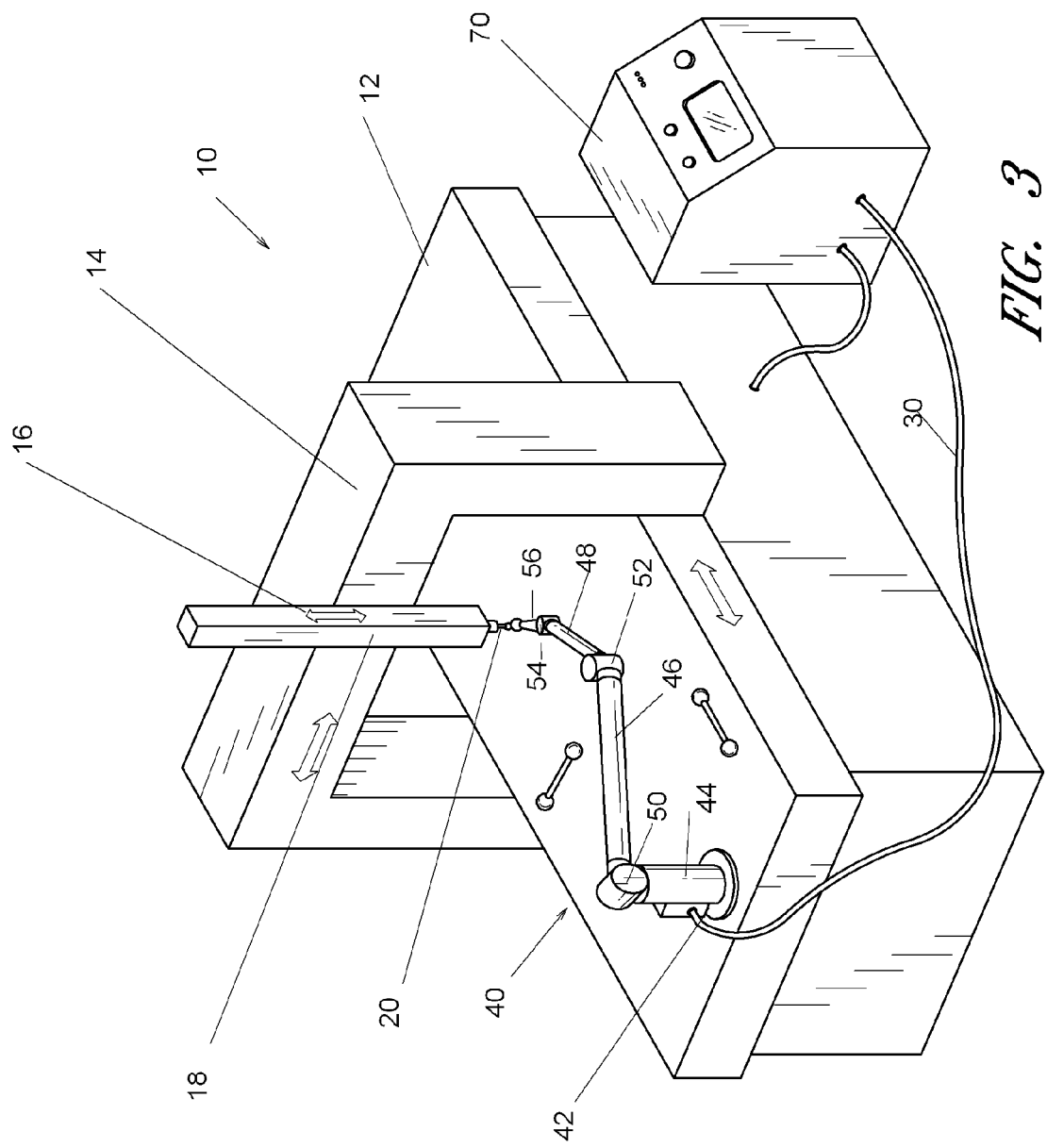
FIG. 3 is a schematic perspective view of the system of FIG. 1 in a third position.

With reference to FIG. 3, a third contact position between the CMM 10 and the PCMM 40 is illustrated. With the CMM 10 remaining in the first position $(x_1, y_1, z_1)$, the PCMM 40 can then be moved to a third position such that the probe head 56 of the PCMM 56 contacts the probe tip 20 of the CMM 10. Desirably, the orientations of the transfer members 44, 46, 48 of the PCMM 10 is different in the third contact position than it is in the first or second contact positions. As noted above, desirably, one or both of the contact probes can include spherical surfaces allowing the probe heads 20, 56 to contact one another at multiple orientations. Again, contact between the two probe heads 20, 56 can trigger a synchronization signal to be sent over the sync cable 30 such that position data of the PCMM 40 and the CMM 10 is captured by the processor 70.

As illustrated in FIGS. 1-3, with the CMM 10 in a first contact position $(x_1, y_1, z_1)$, the PCMM 40 is positioned into three distinct contact positions, and position data is collected regarding each of these contact positions. In other embodiments of this method, more or fewer than three contact positions can be made for each position of the CMM 10, depending on the amount of position data it is desired to generate. For example, in some embodiments, the PCMM 40 can be placed in a single contact position for each position of the CMM 10, while in other embodiments, the PCMM 40 can be repositioned into four, five, or more than five different contact positions for each position of the CMM 10. In some embodiments, it can be desirable to reposition the PCMM 40 in at least 8 contact positions while the CMM 10 is in the first position $(x_1, y_1, z_1)$, thus resulting in a constellation of position data points which can be used to calibrate the PCMM 40. Each data point in turn includes the data for each of the transducers in both of the CMM 10 and the PCMM 40. With more position data from multiple contact points to process, it can be possible to calibrate the PCMM 40 more accurately. However, it can take additional time to reposition the PCMM 40 in multiple positions to obtain additional position data. Therefore, in some embodiments, a balance can be reached between a desire for the additional accuracy obtained from additional positioning and the additional time required to position the PCMM 40.

Figure 4:
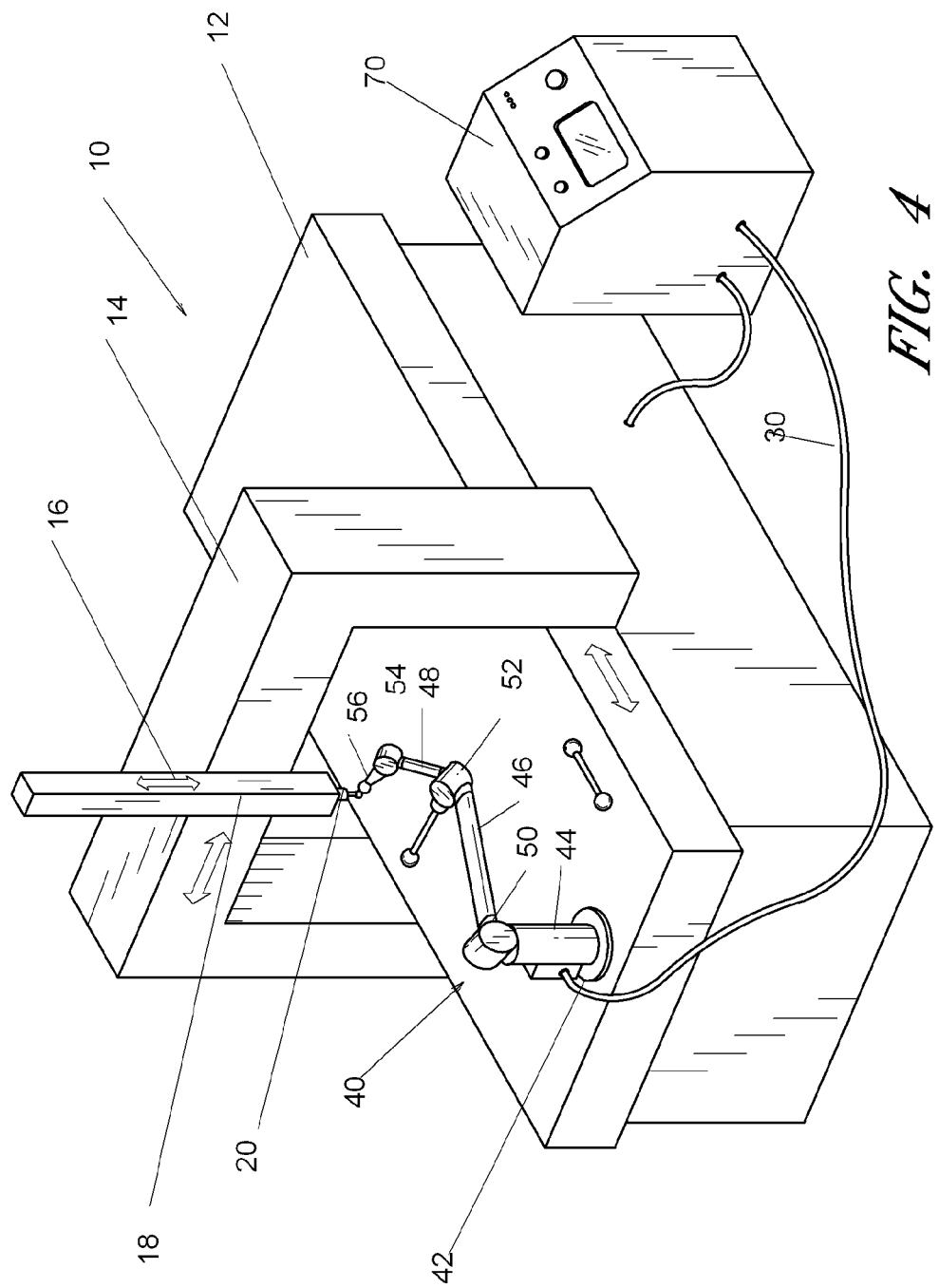
FIG. 4 is a schematic perspective view of the system of FIG. 1 in a fourth position.
Figure 5:
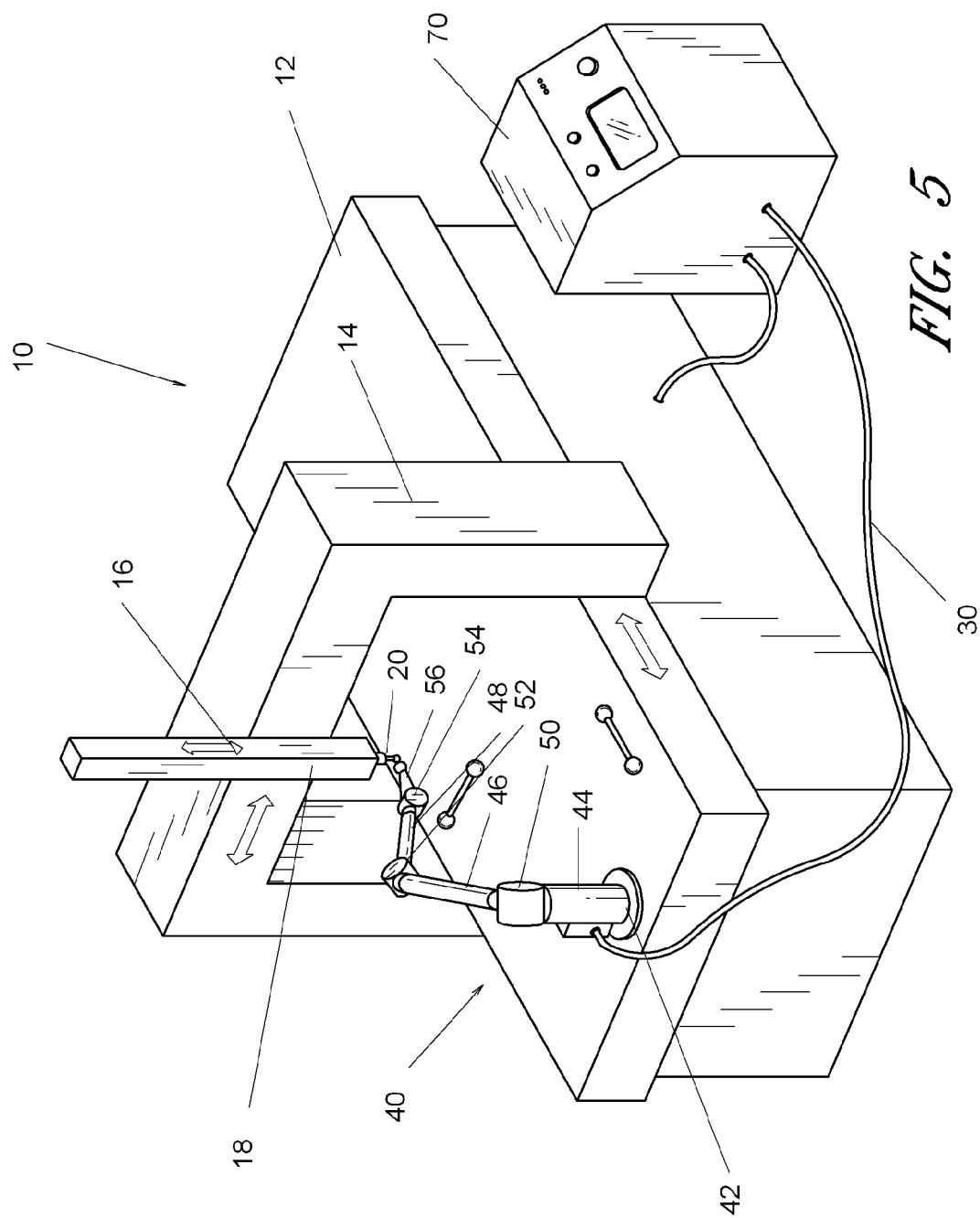
FIG. 5 is a schematic perspective view of the system of FIG. 1 in a fifth position.
Figure 6:
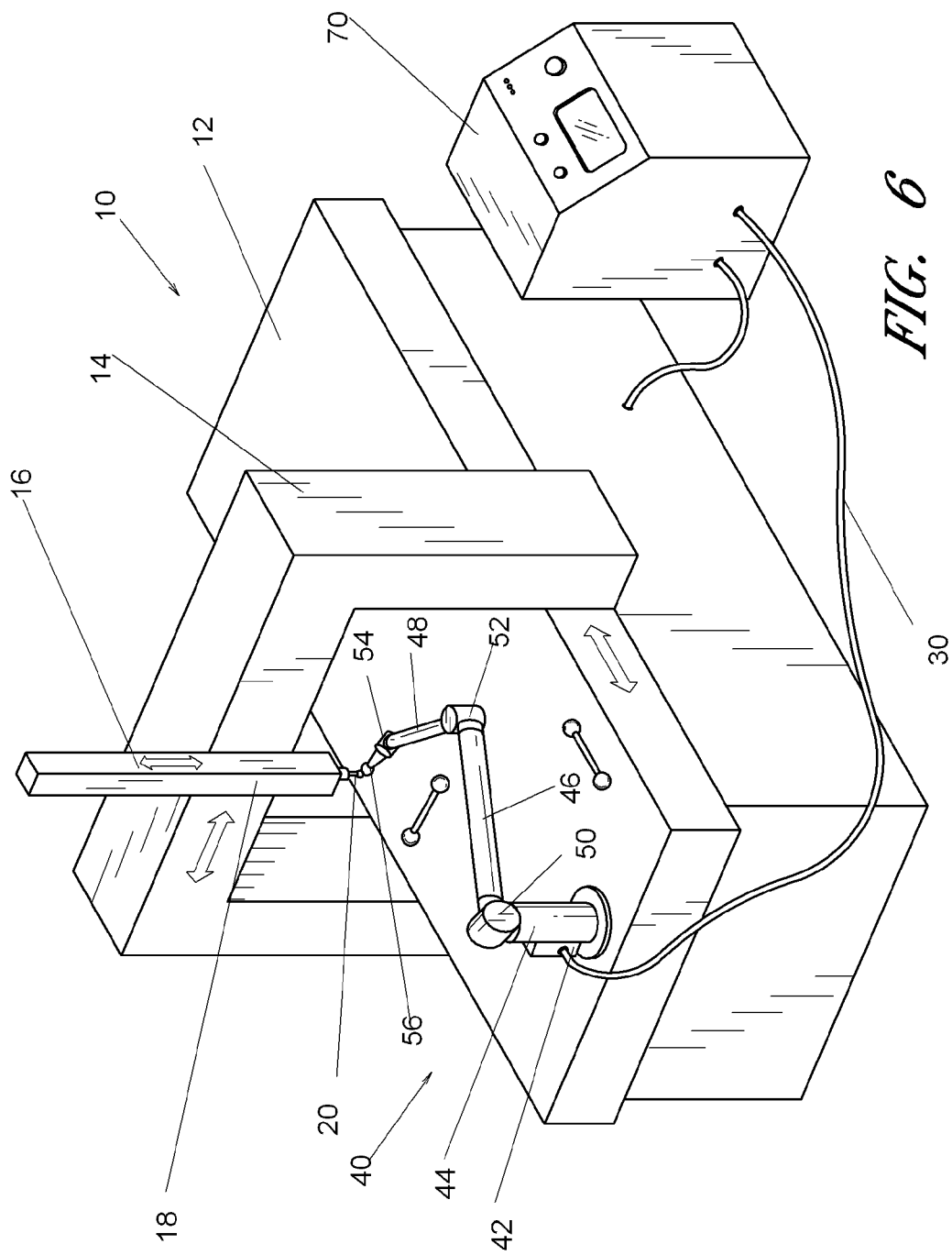
FIG. 6 is a schematic perspective view of the system of FIG. 1 in a sixth position.
Figure 7A:
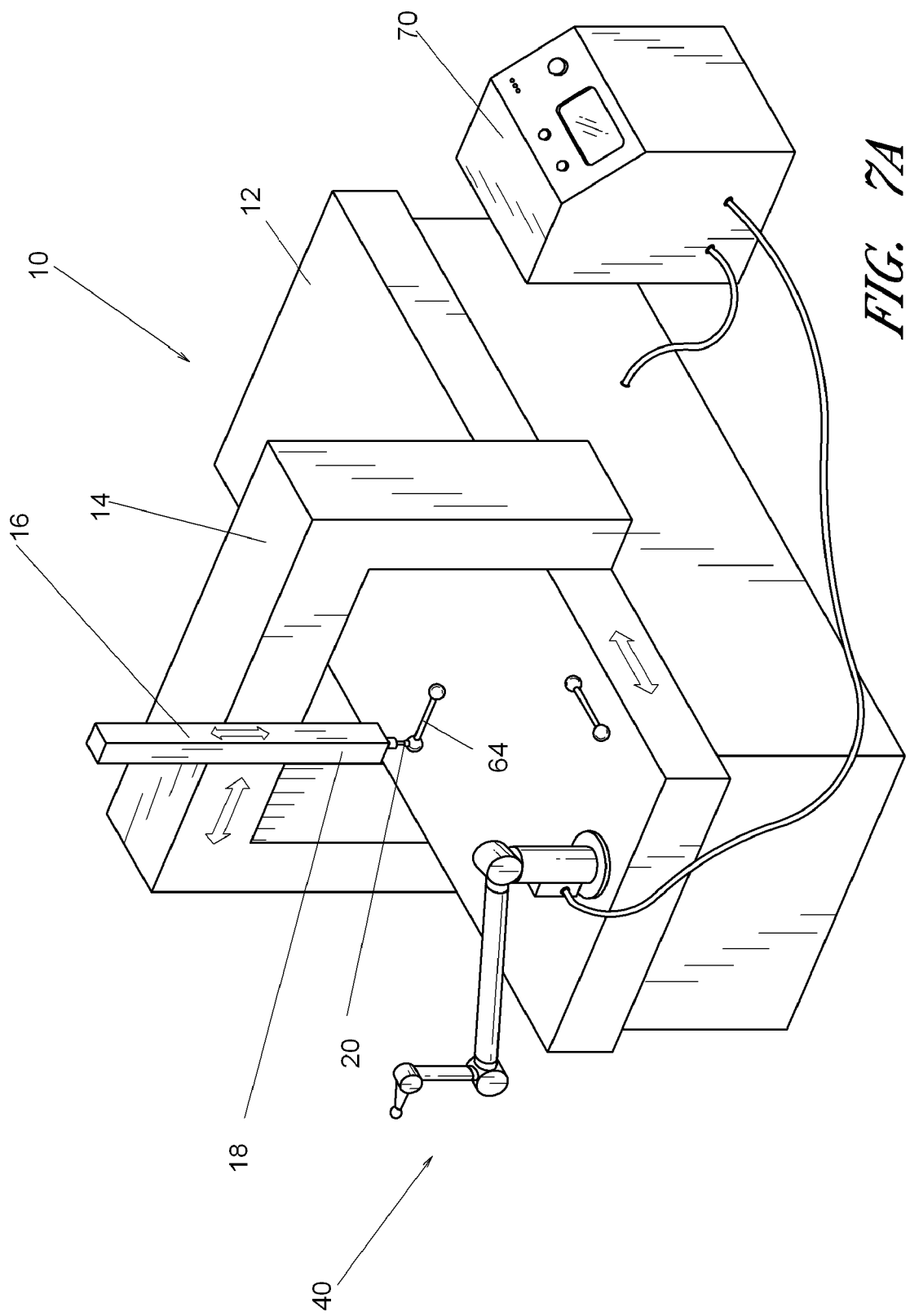
FIG. 7A is a schematic perspective view of the system of FIG. 1 in a first verification position.
Figure 7B:
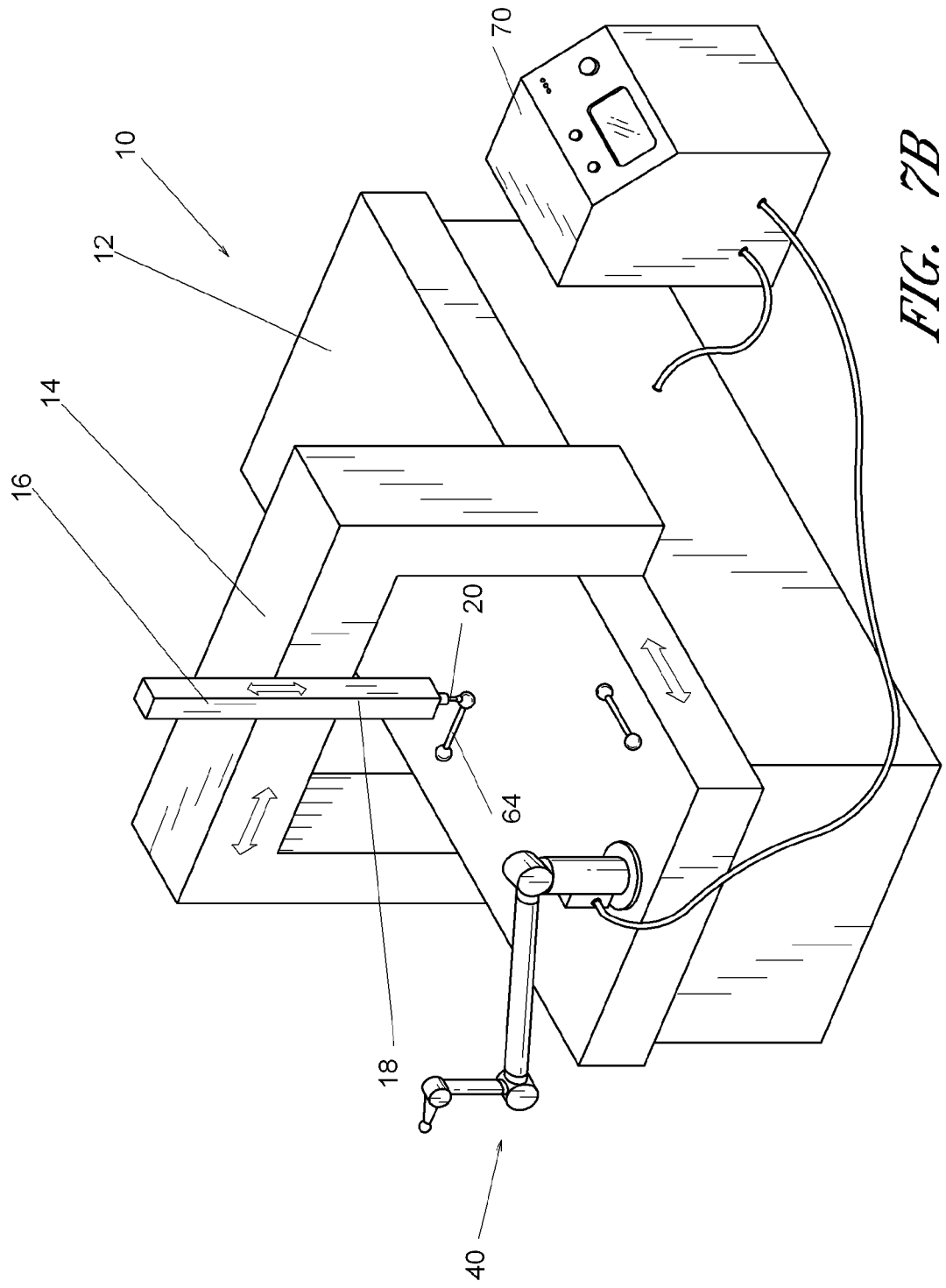
FIG. 7B is a schematic perspective view of the system of FIG. 1 in a second verification position.
Figure 8A:
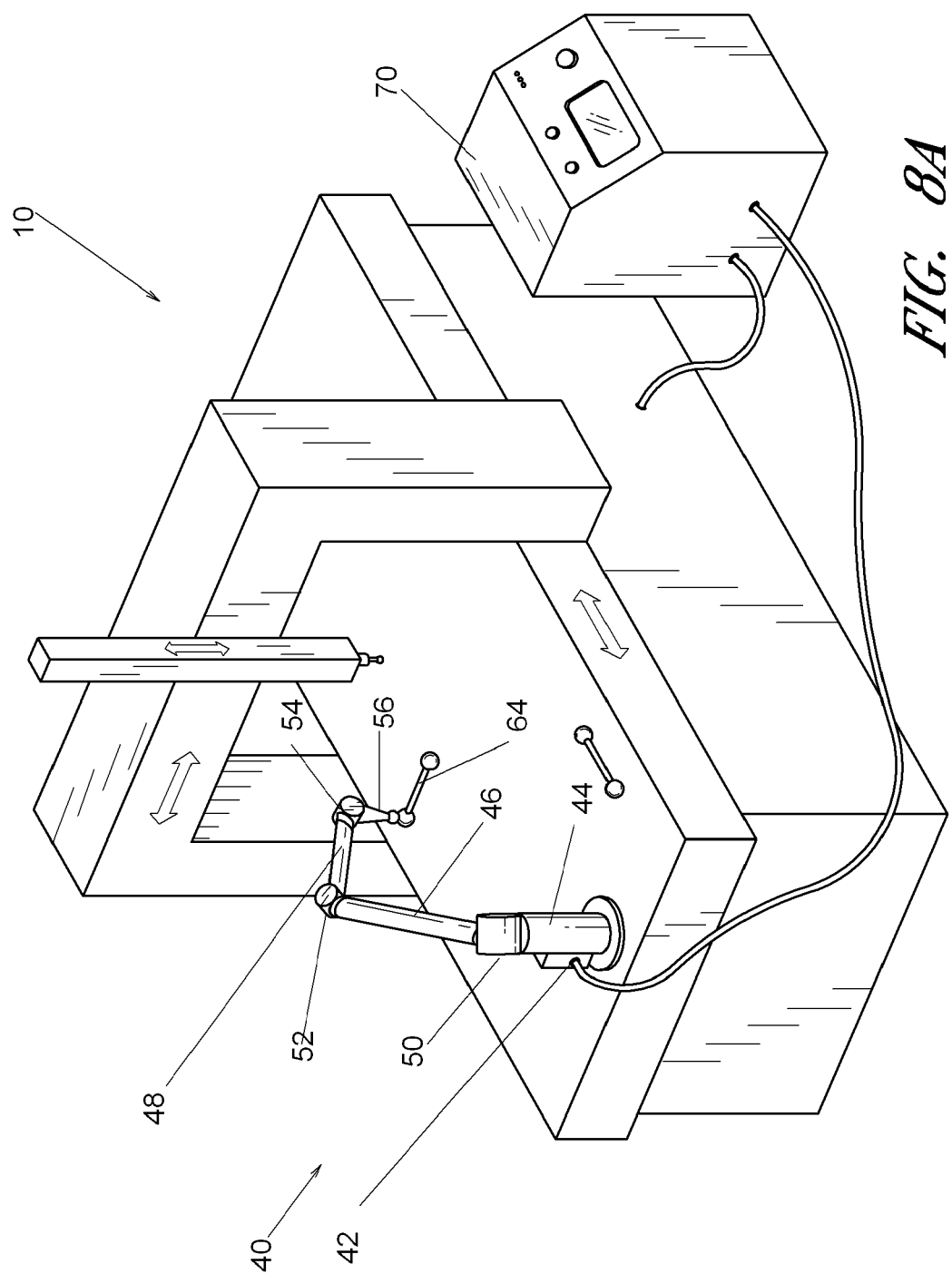
FIG. 8A is a schematic perspective view of the system of FIG. 1 in a third verification position.

FIGS. 4-6 illustrate additional contact positions of the CMM 10 and PCMM 40. In some embodiments of a PCMM calibration method, once a desired number of contact positions has been made between the CMM 10 in the first position $(x_1, y_1, z_1)$, the CMM 10 can be moved into a second position, $(x_2, y_2, z_2)$. In some embodiments, the CMM 10 can be moved with respect to only one or two axis such that one or two of $x_2$, $y_2$, or $z_2$ can equal the corresponding axial component from the first position $x_1$, $y_1$, and $z_1$. In other embodiments, the CMM 10 can be moved in all three axes when moved from the first position $(x_1, y_1, z_1)$ to the second position $(x_2, y_2, z_2)$ such that each of $x_2$, $y_2$, and $z_2$ is different from the corresponding axial component $x_1$, $y_1$, and $z_1$ in the first position.

With reference to FIG. 4, with the CMM 10 in the second position, $(x_2, y_2, z_2)$, the PCMM 40 can be moved into a fourth contact position such that the probe head 56 of the PCMM 56 contacts the probe tip 20 of the CMM 10. Contact between the two probe heads 20, 56 can trigger a synchronization signal to be sent over the sync cable 30 such that position data of the PCMM 40 and the CMM 10 is captured by the processor 70.

With reference to FIG. 5, with the CMM 10 in the second position ($x_2$, $y_2$, $z_2$), the PCMM 40 can be moved into a fifth contact position such that the probe head 56 of the PCMM 56 contacts the probe tip 20 of the CMM 10. Contact between the two probe heads 20, 56 can trigger a synchronization signal to be sent over the sync cable 30 such that position data of the PCMM 40 and the CMM 10 is captured by the processor 70.

With reference to FIG. 6, with the CMM 10 in the second position ($x_2$, $y_2$, $z_2$), the PCMM 40 can be moved into a sixth contact position such that the probe head 56 of the PCMM 56 contacts the probe tip 20 of the CMM 10. Contact between the two probe heads 20, 56 can trigger a synchronization signal to be sent over the sync cable 30 such that position data of the PCMM 40 and the CMM 10 is captured by the processor 70.

While FIGS. 4-6 illustrate three contact positions of the PCMM 40 with the CMM 10 in the second position ($x_2$, $y_2$, $z_2$), in some embodiments, the PCMM 40 can be positioned and repositioned in more or fewer than three contact positions while the CMM 10 is in the second position ($x_2$, $y_2$, $z_2$). In some embodiments, it can be desirable to reposition the PCMM 40 in at least 8 contact positions while the CMM 10 is in the second position ($x_2$, $y_2$, $z_2$), thus resulting in a constellation of position data points which can be used to calibrate the PCMM 40.

With reference to FIGS. 1-6, a method of calibrating a PCMM 40 using a CMM 10 is illustrated including two positions of the CMM 10 and three positions of the PCMM 40 for each position of the CMM 10. Thus, the illustrated embodiment generates six data sets, each data set including position data of the CMM 10 and corresponding position data of the PCMM 40 at each of the contact positions. These data sets can be used to calibrate the PCMM 40 such that it can accurately be used to measure coordinates within a desired tolerance range. It is contemplated that the method described herein can be scaled to generate more or fewer data sets as may be desired to achieve a relatively small tolerance for subsequent measurements taken by the PCMM 40. For example, in some embodiments, it can be desirable to position and reposition the CMM 10 and the PCMM 40 to generate at least 50 contact positions corresponding to 50 data sets. In other embodiments, it can be desirable to generate between 25 and 50 contact positions corresponding to 20-50 data sets.

Advantageously, the calibration method described herein can be used to generate a relatively high number of data sets. This high number of data sets can lead to greater accuracy in calibrating the PCMM. In the prior art methods in which length artifacts are used to generate a number of sets of position data, the number of data points to be obtained can be fairly limited. In contrast, in the method described herein, as the CMM 10 moves form the first position to the second position, the calibration method can use in addition to the distance between the first and second position also use the location of these points in space as measured by the CMM 10. With this additional data, the calibration method can require fewer measurements to achieve the same level of accuracy and reliability. In this manner, the time used to calibrate the PCMM 40 can be decreased and/or the accuracy or reliability of the calibration can increase for the same or similar amount of data points.

For example, in a conventional method using the length artifacts to calibrate a PCMM, the total number of lengths which may be measured by the PCMM can be determined by the formula:

$$L = s * \frac{n!}{(n-r)! * r!}$$

Where:
L is the total number of lengths;
s is the number of bar positions;
n is the number of points per bar that are measured; and
r is the number of points per length (typically 2).

Accordingly, for a bar having three measurable points (n=3) that is positioned in two positions (s=2), the total number of lengths which may be used to calibrate the PCMM is six lengths (L=6).

In contrast, using the calibration method described herein, the total number of lengths which may be measured by the PCMM can be determined by the formula:

$$L = \frac{n!}{(n-r)! * r!}$$

Where:
L is the total number of lengths;
n is the number of points (CMM positions) that are measured; and
r is the number of points per length (2).

For a calibration where 6 CMM points (n=6) is used, the total number of lengths which may be used to calibrate the PCMM is 15 lengths (L=15). Note that this 6 CMM point calibration roughly corresponds to the example described above using the conventional method worry about having three measurable points was positioned in two positions. Accordingly, the calibration method described herein allows additional data to be generated to calibrate the PCMM.

As the number of calibration points increases, so too does the amount of additional data generated by the method described herein. For example, for a calibration using a length artifact with 120 bar positions (s=120) and three points per bar position (n=3), 360 lengths (L=360) are generated to calibrate the PCMM. A corresponding calculation using the method described here and with a CMM positioned at 360 points (n=360) generates 64,620 lengths (L=64,620) to calibrate the PCMM.

Advantageously, the calibration method described herein can allow rapid calibration of a PCMM. As described above, the method described herein, when implemented with manual positioning and repositioning of the PCMM can generate more data sets of PCMM position data for a given period of time than the prior art methods.

Figure 13:
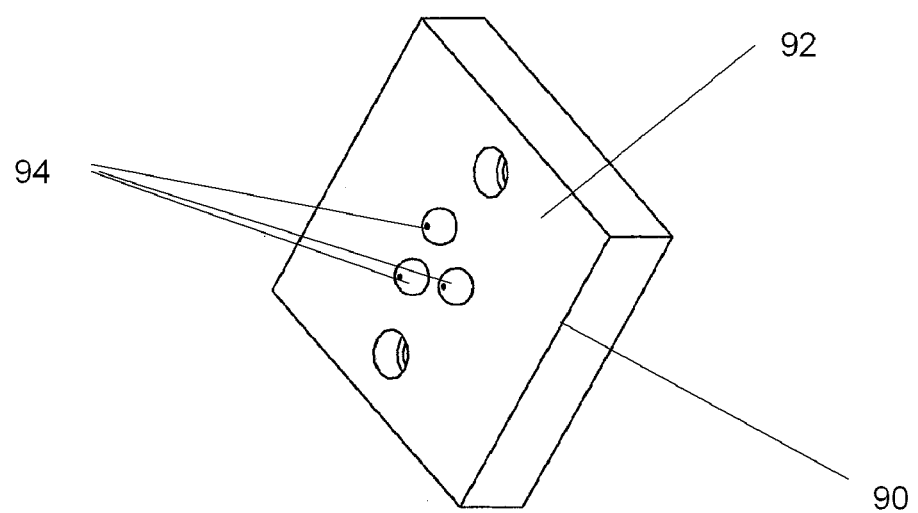
FIG. 13 is a perspective view of a contact probe for use in the system of FIG. 1.

Unlike prior art calibration techniques, the method described herein can also be implemented with an PCMM having an articulator to mechanically position the PCMM. Such articulated positioning of the PCMM arm can lead to additional time savings in the calibration method described herein. One example of an articulator for a PCMM is described in U.S. Pat. No. 7,152,456, entitled "Automated Robotic Measuring System," which is hereby incorporated herein by reference in its entirety. For example, the PCMM can include a powered exoskeletal frame comprising an articulated support arm comprising a plurality of jointedly interconnected support arm segments moveable about a plurality of axes. FIG. 13 illustrates one embodiment of an exoskeletal frame articulator.

Validation of Calibration Method

With reference to FIGS. 7A, 7B, 8A, and 8B, in some embodiments, a method of calibrating a PCMM 40 can include validating the calibration with length artifacts. As used in the prior art calibration methods for a PCMM 40, length artifacts are typically metal rods manufactured with tight tolerances to have precise dimensions. As noted above, in prior art methods, length artifacts, including metal rods of a predetermined length having spherical ends, can be used to calibrate a PCMM. Conventional artifacts for calibration and/or certification can include ball bars, step gauges, bars with comical seats, and gauge blocks. The precision of the dimensions required to be used for calibration of a PCMM, however, can make these length artifacts very expensive and difficult to manufacture. Additionally, even with precision manufacturing, the length artifacts can be subject to some variation in length due to thermal expansion depending on ambient conditions. However, when length artifacts are used as a validation of a calibration of a PCMM 40 by a CMM 10, their dimensions need not be precisely manufactured. Likewise, length variations due to thermal expansion are not likely to introduce error into the calibration. Thus, length artifacts for validating a calibration method need not be as expensive or difficult to manufacture as those used in prior art methods of PCMM calibration.

With continued reference to FIGS. 7A, 7B, 8A, and 8B, in some embodiments of a method of PCMM calibration, validation with a length artifact can include positioning a length artifact 64 on the worktable 12 of the CMM 10, positioning the probe tip 20 CMM 10 at one end of the length artifact (FIG. 7A), obtaining position data from the CMM 10, positioning the probe tip 20 of the CMM 10 at the opposite end of the length artifact 64 (FIG. 7B), and obtaining position data from the CMM 10. In the illustrated embodiment of validation, the probe tip 20 of the CMM 10 can then be positioned away from the length artifact 64. The PCMM 40 can then be positioned such that the probe head 56 of the PCMM 40 contacts one end of the length artifact 64 (FIG. 8A), and position data of the PCMM obtained. The PCMM 40 can then be repositioned such that the probe head 56 of the PCMM 40 contacts the opposite end of the length artifact 64 (FIG. 8B), and position data of the PCMM 40 obtained.

Once the validation sequence has been performed as discussed above with respect to FIGS. 7A, 7B, 8A, and 8B, position data of the CMM 10 and the PCMM 40 can then be compared. In some embodiments of calibration method, the PCMM 40 can be positioned in more than one contact positions with each end of the length artifact 64. In some embodiments, the processor 70 can be configured to quantify an error between the positions of the CMM 10 position and the PCMM 40 position. If an error identified between the positions of the CMM 10 and the PCMM 40 is greater than a predetermined error threshold, the PCMM 40 can be recalibrated by the CMM 10 according to the method described herein. If the error identified by the CMM 10 and the PCMM 40 is within a predetermined error threshold, the PCMM 40 can be considered calibrated.

Probe Head Configurations

With reference to FIGS. 9A, 10A, 11A, and 12A, in various embodiments, different configurations of probe heads 20, 56 can be used in the PCMM 40 calibration method described herein. Several possible configurations of probe heads 20, 56 are illustrated, although it is contemplated that other, non-illustrated configurations can be used. As noted above, it can be desirable that at least one of the probe heads 20, 56 include a profile, such as a spherical profile or a segment of a spherical profile, which allows the probe heads 20, 56 to contact one another in multiple orientations.

Figure 9A:
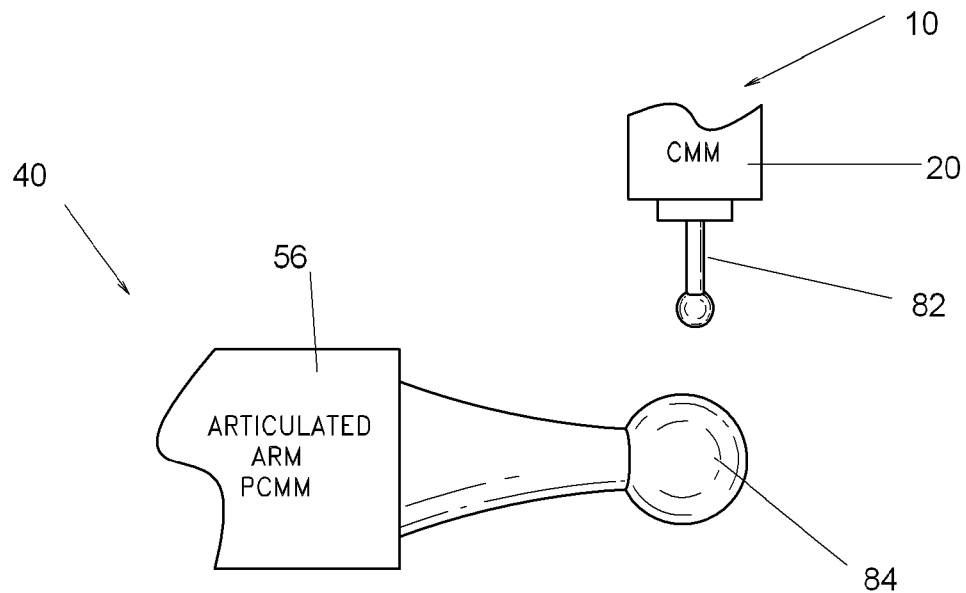
FIG. 9A is a schematic illustration of one configuration of probes for the system of FIG. 1.

With reference to FIG. 9A, in some embodiments, the probe tip 20 on the CMM 10 can comprise a touch trigger probe 82, and the probe head 56 on the PCMM 40 can comprise a hard probe 84. The touch trigger probe 82 can include an electric switch configured to signal the processor 70 when contact has been made, as further discussed below with reference to FIG. 9B. The hard probe 84 can be electrically passive. The hard probe 84 can include probe surface defined by a substantially spherical ball. Accordingly, the PCMM 40 can be repositioned into many orientations with respect to the CMM 10 which define contact positions as the touch trigger probe can contact different areas of the spherical ball in various contact positions. Various touch trigger probes and hard probes are readily available for use with PCMMs and CMMs and can be used in the PCMM calibration methods described herein.

Figure 9B:
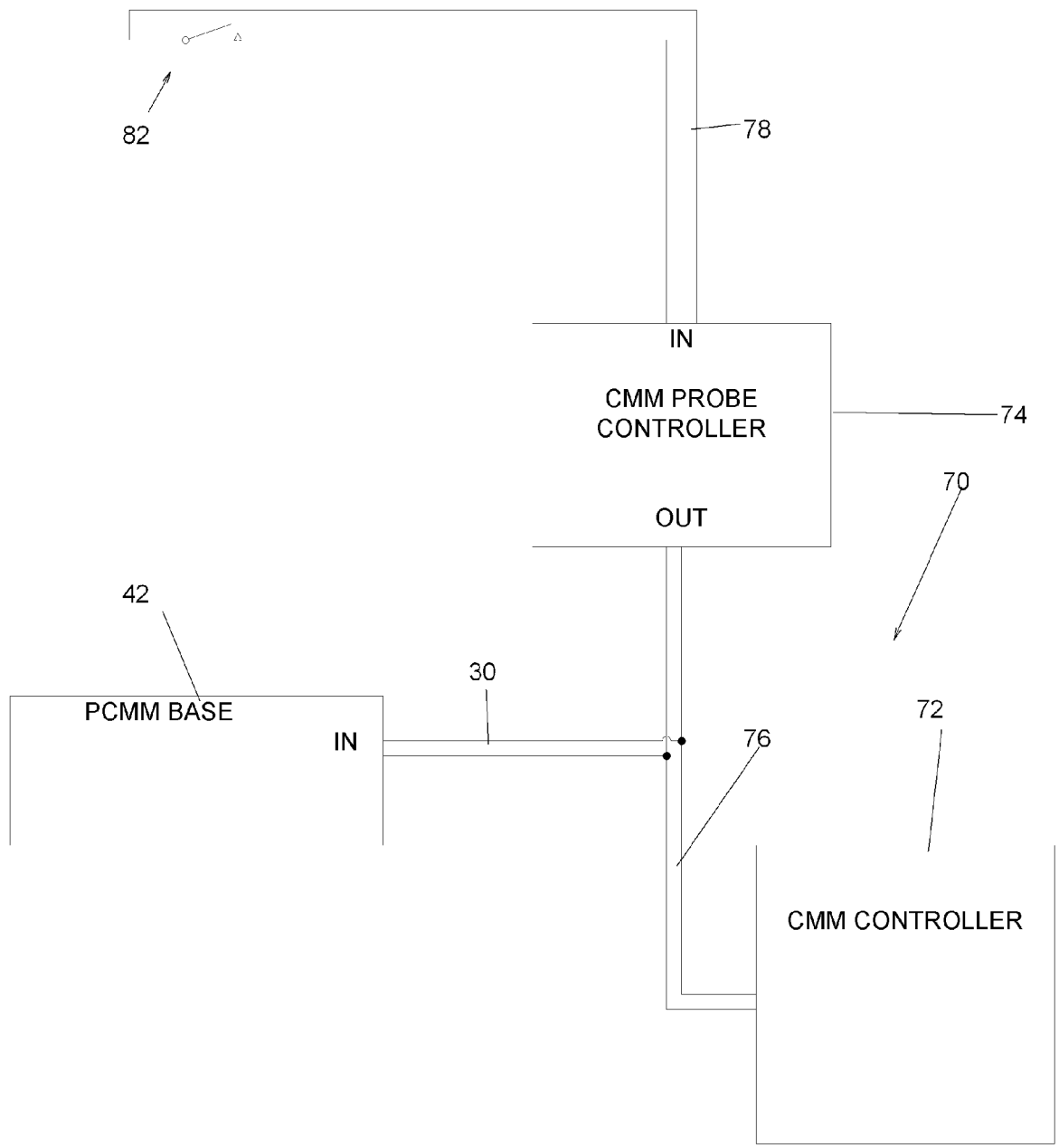
FIG. 9B is a schematic illustration of a electrical connection for the probe configuration of FIG. 9A.

As discussed above, when a contact position between the probe heads 20, 56 is achieved, it is desirable to simultaneously obtain position data from both the CMM 10 and the PCMM 40. The CMM 10 and PCMM 40 can be operatively coupled to achieve the desired synchronization of position data. FIG. 9B illustrates a possible connection between the CMM 10 and PCMM 40 with a configuration of probe heads 20, 56 as illustrated in FIG. 9A.

With reference to FIG. 9B, the processor 70 can include a CMM controller 72 electrically coupled to a CMM probe controller 74. The electric coupling is schematically illustrated as a wired connection 76, however, it is contemplated that in some embodiments, the CMM controller 72 can be wirelessly coupled to the CMM probe controller 74. In other embodiments, the CMM controller 72 and the CMM probe controller 74 can be integrated in a single integrated device. The touch trigger probe 82 is schematically illustrated as a switch having a wired connection 78 to the CMM probe controller 74. Accordingly, when the touch trigger probe 82 contacts the hard probe 84 (FIG. 9A), a position signal is sent from the CMM 10 to the CMM probe controller 74, which processes the signal and passes it along to the CMM controller 72 and the PCMM. The PCMM can be electrically coupled to the CMM between the CMM probe controller 74 and the CMM controller 72. In the illustrated embodiment, this electrical coupling is illustrated as a sync cable 30 forming a wired connection between the CMM 40 and the wired connection 76 between the CMM probe controller 74 and the CMM controller 72. Thus, in the illustrated configuration, when a contact position is made, a sync signal is sent over the sync cable 30 to the PCMM 40 to obtain position data.

Figure 10A:
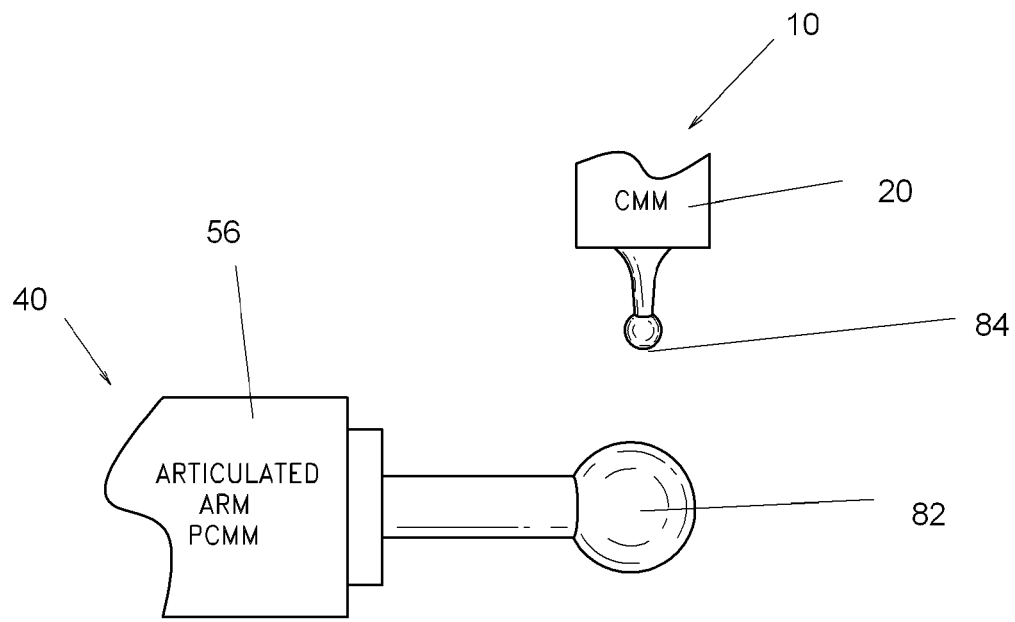
FIG. 10A is a schematic illustration of one configuration of probes for the system of FIG. 1.

With reference to FIG. 10A, another probe head configuration for use in the calibration systems and methods described herein is illustrated. As illustrated, the CMM 10 can have a probe tip 20 comprising a hard probe 84 substantially as described above with respect to FIG. 9A. The PCMM 40 can have a touch trigger 82 substantially as described above with respect to FIG. 9A. As described above, this configuration of probe heads can desirably allow multiple repositionings of the CMM and PCMM to generate a constellation of data sets for each position of the CMM.

Figure 10B:
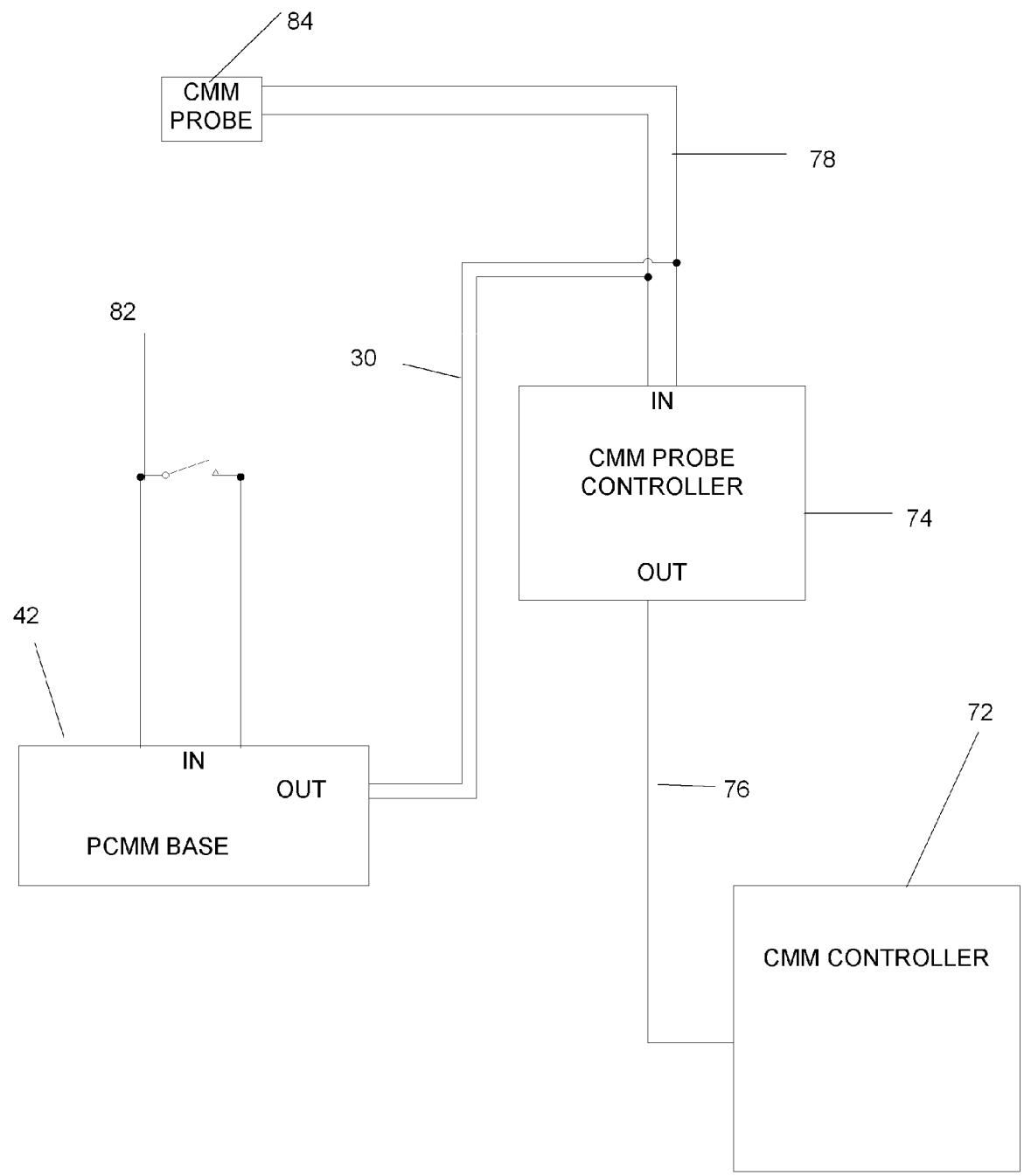
FIG. 10B is a schematic illustration of an electrical connection for the probe configuration of FIG. 10A.

With reference to FIG. 10B, a schematic illustration is provided of an electrical coupling of the PCMM to the CMM with the probe head configuration of FIG. 10A. As illustrated, the touch trigger probe 82 is schematically illustrated as a switch on the PCMM 40. The PCMM is electrically coupled over the sync cable 30 to a wired connection 78 between the hard probe 84 on the CMM 10 and the CMM probe controller 74. Accordingly, when contact between the touch trigger probe 82 and the hard probe 84 is made, a sync signal can be sent along the sync cable 30 to the CMM probe controller 74 to obtain position data from the CMM. Thus, once a contact position is reached, position data from both the CMM and PCMM is simultaneously obtained by the processor 70. As discussed above with respect to other embodiments, it is contemplated that while wired connections are schematically illustrated herein, wireless connections, or other integration can be used in other embodiments to allow similar functionality.

Figure 11A:
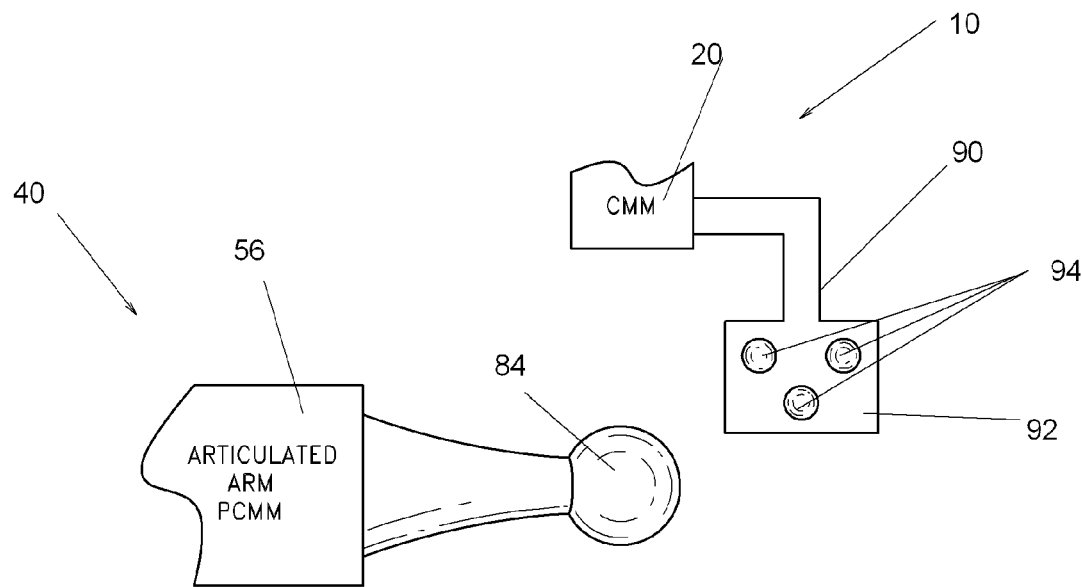
FIG. 11A is a schematic illustration of one configuration of probes for the system of FIG. 1.

With reference to FIG. 11A, another probe head configuration for use in the calibration systems and methods described herein is illustrated. As illustrated, the CMM 10 can have a probe tip 20 comprising a switched contact probe such as a three-ball kinematic mount probe 90 as described further below. The PCMM 40 can have a hard probe 84 substantially as described above with respect to FIG. 9A. As described above, this configuration of probe heads can desirably allow multiple repositionings of the CMM and PCMM to generate a constellation of data sets for each position of the CMM.

Figure 14:
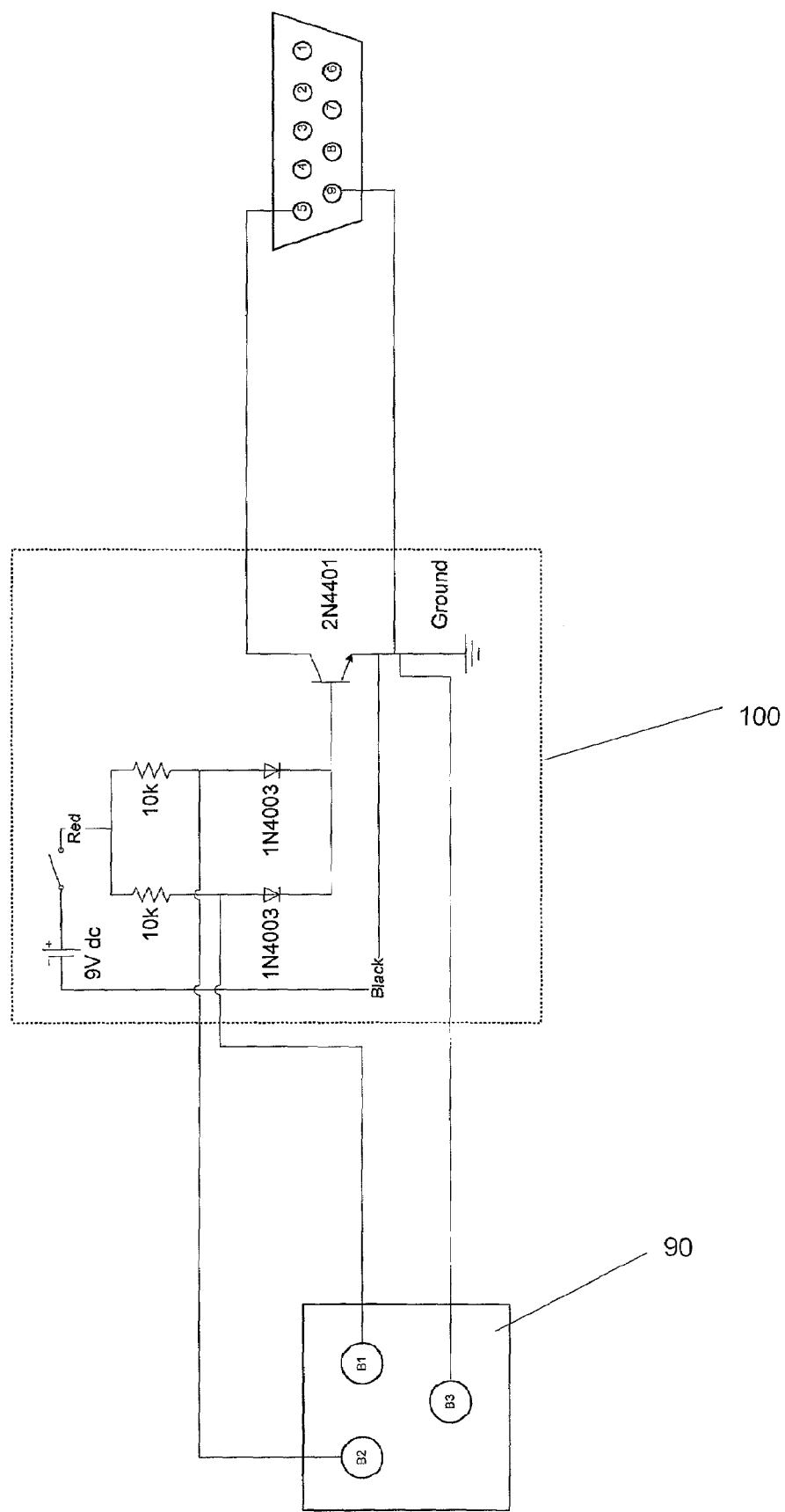
FIG. 14 is a schematic view of a switch circuit for the contact probe of FIG. 13.
Figure 15:
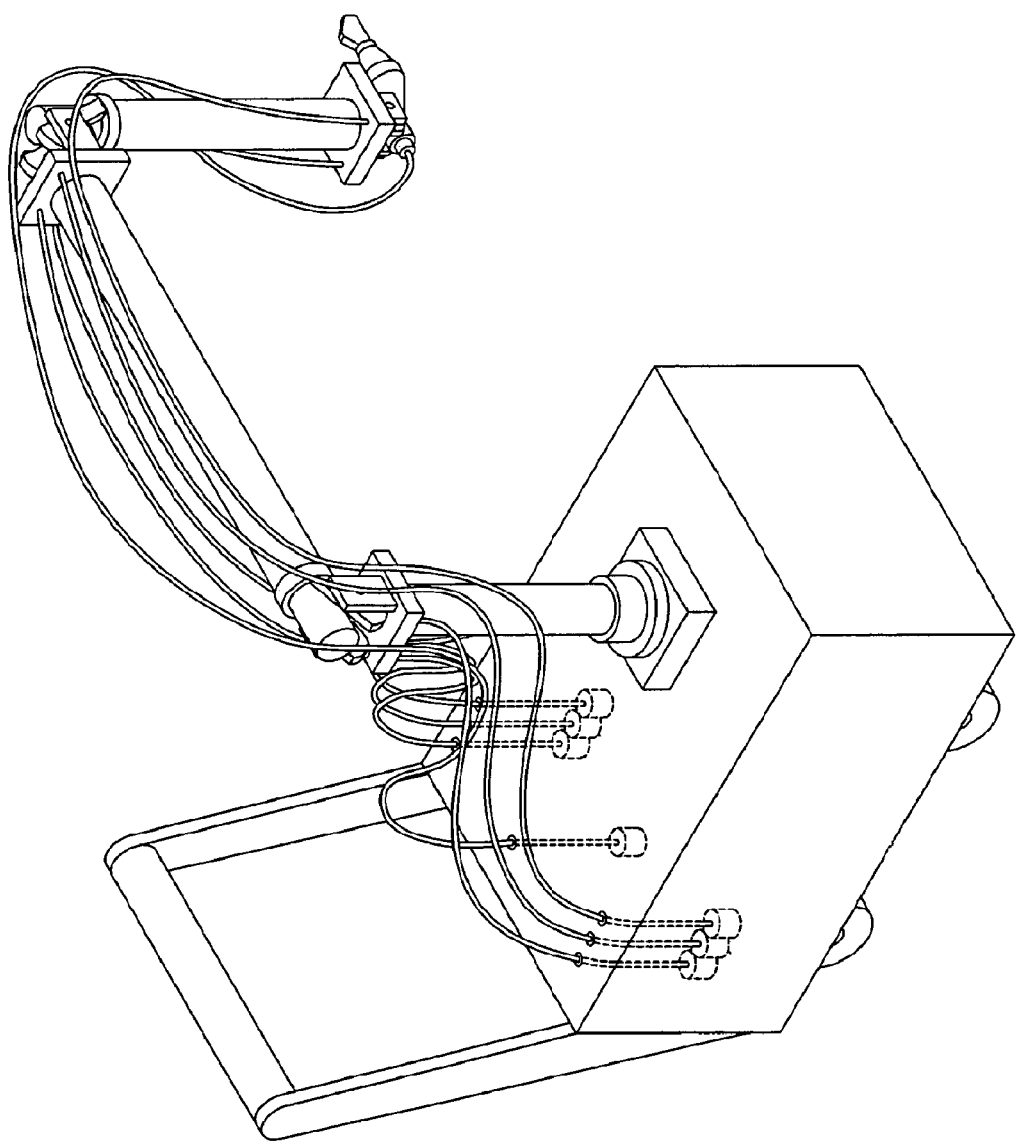
FIG. 15 is a PCMM having an articulating exoskeletal frame.

With reference to FIGS. 11A, 13, and 14, the three-ball kinematic mount probe 90 can comprise a base plate 92 and three contact balls 94. The contact balls 94 can be at least partially seated in the base plate 92 such that only a spherical portion protrudes from the surface of the base plate 92. In some embodiments, the contact balls 94 need not be completely spherical. Rather, portions of spherical balls can be used. The contact balls 94 can be arranged to form a seat in the base plate. In the illustrated embodiment, for example, the contact balls 94 are arranged as vertices of a substantially equilateral triangle, thus forming a seat in the base plate 92 defined by an interior of the triangle. A hard probe 84 can be positioned in the seat and simultaneously contact each of the three contact balls 94. As further described below with reference to FIG. 14, contact of the hard probe with the three contact balls 94 simultaneously activates an electrical switch. Simultaneous contact of fewer than all three of the contact balls 94 does not activate the switch. Desirably, this arrangement allows for repeated kinematic mounting and contact with all three of the contact balls 94 at various orientations by a hard probe or other probe head attachment. While the contact probe is illustrated as having three contact balls 94 arranged in a triangular configuration on the base plate 92 to provide repeatable kinematic mounting with a hard probe, in other embodiments, more or fewer than three contact balls 94 can be used. Likewise, in other embodiments, contact balls can be arranged in other geometries on the base plate 92.

Figure 11B:
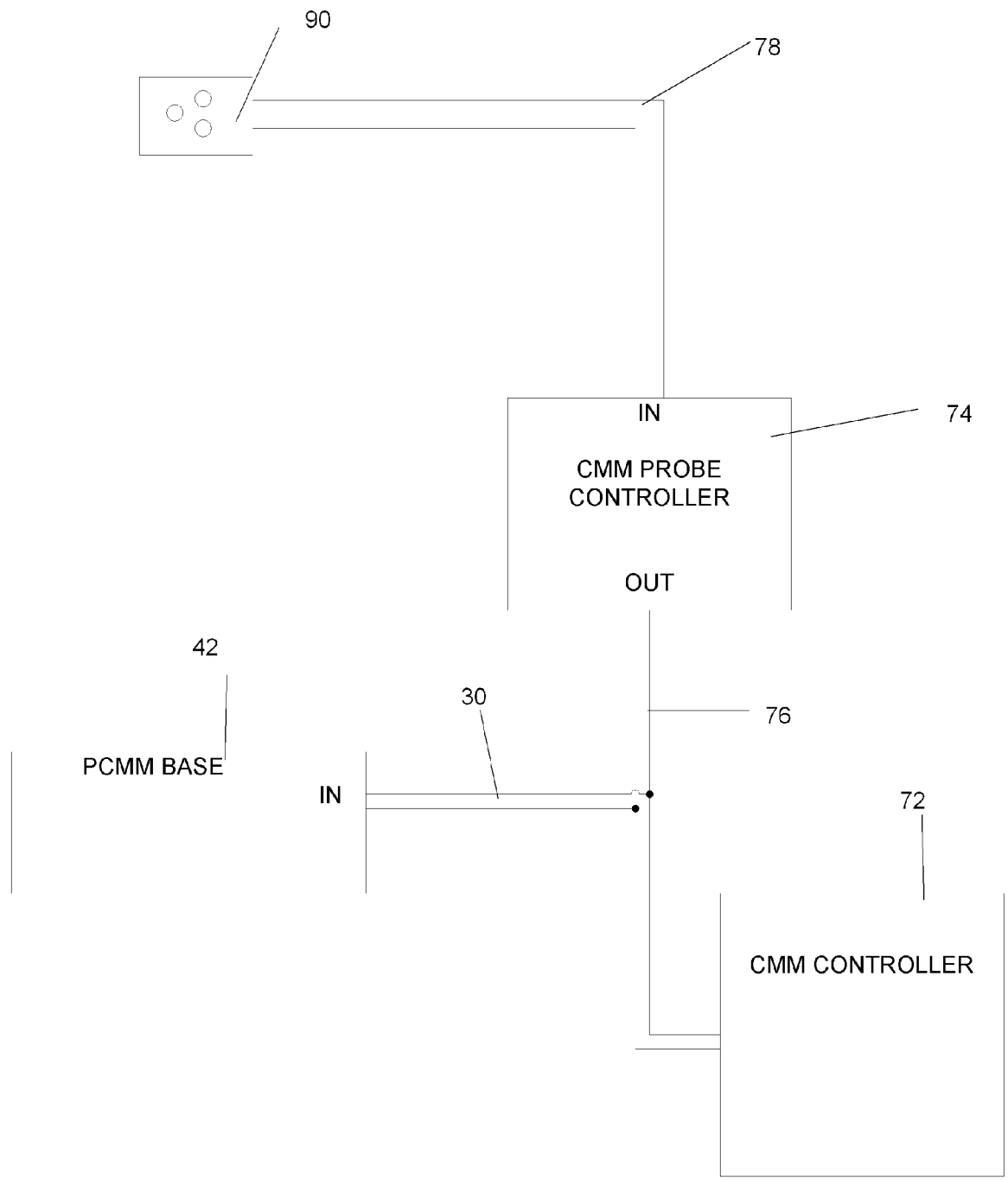
FIG. 11B is a schematic illustration of an electrical connection for the probe configuration of FIG. 11A.

With reference to FIG. 11B, a schematic illustration is provided of an electrical coupling of the PCMM to the CMM with the probe head configuration of Figure 11A. The electric connections in this embodiment are substantially similar to those illustrated and described above with reference to the embodiment of FIG. 9B. As illustrated, the three-ball kinematic mount probe 90 is schematically illustrated as a switch on the CMM 10 that is electrically coupled over a wired connection 78 to the CMM probe controller 74. As illustrated, the PCMM is electrically coupled over the sync cable 30 to a wired connection 76 between the CMM probe controller 74 and the CMM controller 72. Accordingly, when contact between the contact probe 90 and the hard probe 84 is made, a sync signal can be sent along the sync cable 30 to the PCMM 40 to obtain position data from the PCMM 40. Thus, once a contact position is reached, position data from both the CMM and PCMM is simultaneously obtained by the processor 70.

As discussed above with respect to other embodiments, it is contemplated that while wired connections are schematically illustrated herein, wireless connections, or other integration can be used in other embodiments to allow similar functionality.

With reference to FIG. 14, a schematic illustration of one embodiment of circuit to allow switching of the contact probe 90 as described above is provided. In the illustrated embodiment, each of the contact balls is electrically coupled to a switching circuit 100. The switching circuit 100 has two output wires and outputs either a switch on or off signal, similar to a simple switch. While a particular arrangement of components is illustrated in the switching circuit 100, it is contemplated that various other arrangements can be made to output an on or off signal. Furthermore, while the switching circuit is illustrated as wired to the contact probe 90, in some embodiments, the switching circuit 100 can be integrated with the contact probe 90. In still other embodiments, the switching circuit 100 can be integrated with the processor 70.

Figure 12A:
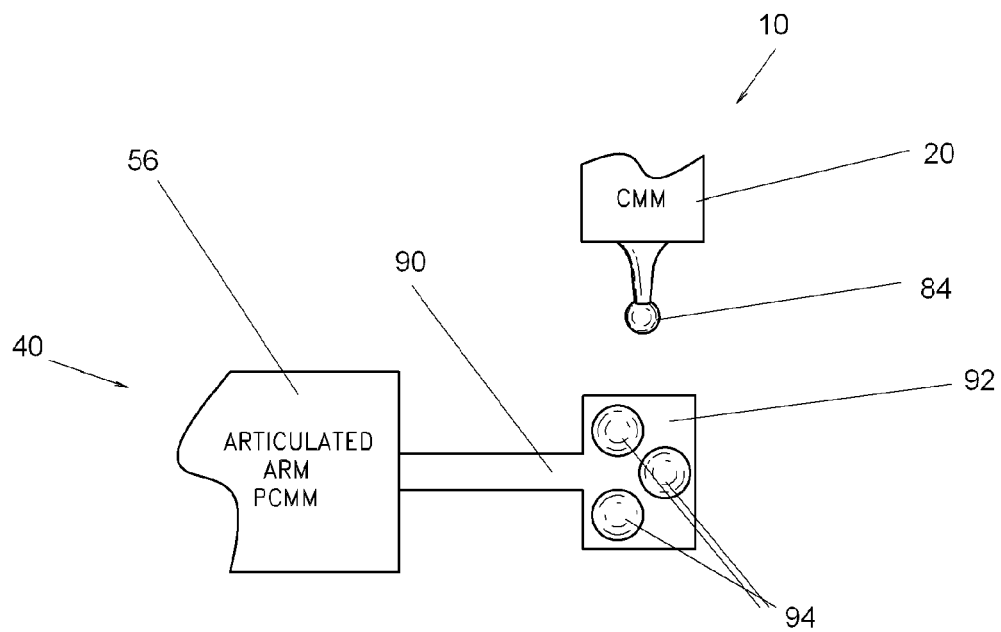
FIG. 12A is a schematic illustration of one configuration of probes for the system of FIG. 1.

With reference to FIG. 12A, another probe head configuration for use in the calibration systems and methods described herein is illustrated. As illustrated, the PCMM 40 can have a probe head 56 comprising a switched contact probe such as a three-ball kinematic mount probe 90 as described above. The CMM 10 can have a hard probe 84 substantially as described above with respect to FIG. 10A. As described above, this configuration of probe heads can desirably allow multiple repositionings of the CMM and PCMM to generate a constellation of data sets for each position of the CMM.

Figure 12B:
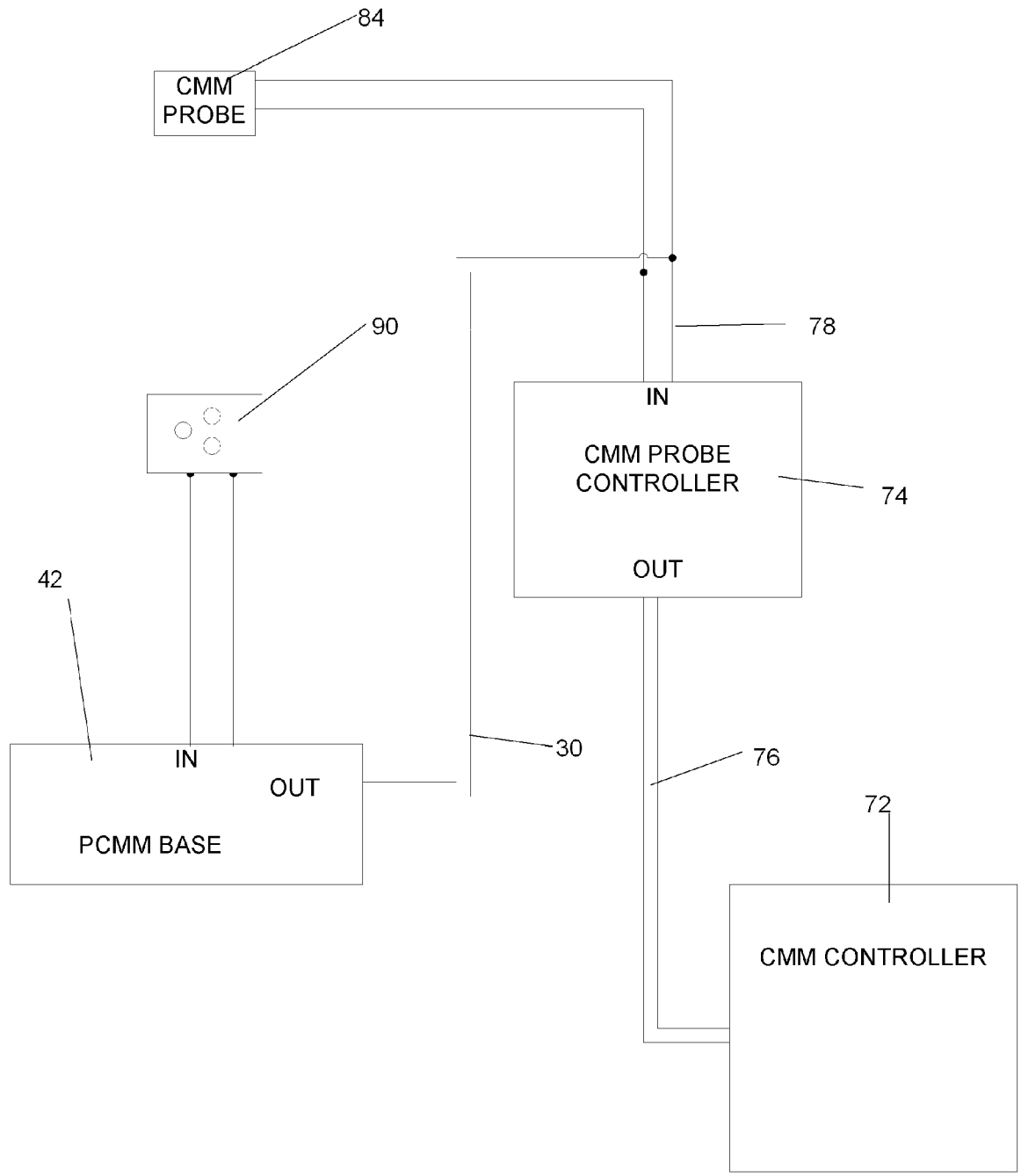
FIG. 12B is a schematic illustration of an electrical connection for the probe configuration of FIG. 12A.

With reference to FIG. 12B, a schematic illustration is provided of an electrical coupling of the PCMM to the CMM with the probe head configuration of FIG. 12A. As illustrated, the contact probe 90 is schematically illustrated as a switch on the PCMM 40. The PCMM is electrically coupled over the sync cable 30 to a wired connection 78 between the hard probe 84 on the CMM 10 and the CMM probe controller 74. Accordingly, when contact between the contact probe 90 and the hard probe 84 is made, a sync signal can be sent along the sync cable 30 to the CMM probe controller 74 to obtain position data from the CMM. Thus, once a contact position is reached, position data from both the CMM and PCMM is simultaneously obtained by the processor 70. As discussed above with respect to other embodiments, it is contemplated that while wired connections are schematically illustrated herein, wireless connections or other integration can be used in other embodiments to allow similar functionality.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments, combinations, sub-combinations and/or uses and obvious modifications and equivalents thereof. Accordingly, the invention is not intended to be limited by the specific disclosures of preferred embodiments herein.

What is claimed is:

1. A method for calibrating a portable coordinate measurement machine having a probe comprising;

providing a coordinate measurement machine having a measurement probe;

positioning the coordinate measurement machine in a first calibration position;
positioning the portable coordinate measurement machine in a first position such that the probe contacts the measurement probe of the coordinate measurement machine in the first calibration position;
positioning the coordinate measurement machine in a second calibration position; and
positioning the portable coordinate measurement machine in a second position such that the probe contacts the measurement probe of the coordinate measurement machine in the second calibration position.

2. The method of claim 1, further comprising generating a signal when the probe of the portable coordinate measurement machine contacts the measurement probe of the coordinate measurement machine.

3. The method of claim 2, wherein one of the probe and the measurement probe comprises a touch trigger probe configured to generate the signal.

4. The method of claim 2, wherein one of the probe and the measurement probe comprises a contact probe comprising a plate having three spherical portions positioned thereon and defining a seat on the plate, the contact probe configured to generate a signal when contact is simultaneously made with all of the three spherical portions.

5. The method of claim 1, wherein the probe comprises a passive probe and the measurement probe comprises a touch trigger probe.

6. The method of claim 1, wherein the probe comprises a touch trigger probe and the measurement probe comprises a passive probe.

7. The method of claim 1, wherein the probe comprises a contact probe comprising a plate having three spherical portions positioned thereon and defining a seat on the plate, the contact probe configured to generate a signal when contact is simultaneously made with all of the three spherical portions, and the measurement probe comprises a passive probe.

8. The method of claim 1, wherein the probe comprises a passive probe and the measurement probe comprises a contact probe comprising a plate having three spherical portions positioned thereon and defining a seat on the plate, the contact probe configured to generate a signal when contact is simultaneously made with all of the three spherical portions.

9. The method of claim 1, further comprising positioning the portable coordinate measurement machine in at least one supplemental position such that the probe contacts the measurement probe of the coordinate measurement machine in the first calibration position.

10. The method of claim 9, further comprising positioning the portable coordinate measurement machine in at least one supplemental position such that the probe contacts the measurement probe of the coordinate measurement machine in the second calibration position.

11. The method of claim 9, wherein the at least one supplemental position comprises three or more supplemental positions.

12. The method of claim 1, wherein the probe of the portable coordinate measurement machine and the measurement probe of the coordinate measurement machine are positioned in at least fifty distinct positions of contact with one another.

13. The method of claim 1, further comprising:
positioning the coordinate measurement machine in a third calibration position; and
positioning the portable coordinate measurement machine in a third position such that the probe contacts the measurement probe of the coordinate measurement machine in the third calibration position.

14. A system for calibrating a portable coordinate measurement machine comprising;
a coordinate measurement machine;
a portable coordinate measurement machine;
a control unit operatively coupled to the coordinate measurement machine and the portable coordinate measurement machine.

15. The system of claim 14, wherein the control unit comprises a coordinate measurement machine probe control module operatively coupled to a coordinate measurement machine controller, wherein the coordinate measurement machine comprises a touch trigger probe, and wherein the portable coordinate measurement machine is operatively coupled to the control unit between the coordinate measurement machine probe control module and the coordinate measurement machine controller.

16. The system of claim 14, wherein the control unit comprises a coordinate measurement machine probe control module operatively coupled to a coordinate measurement machine controller, wherein the portable coordinate measurement machine comprises a touch trigger probe, and wherein the portable coordinate measurement machine is operatively coupled to the control unit between the coordinate measurement machine probe control module and a probe of the coordinate measurement machine.

17. The system of claim 14, wherein the control unit comprises a coordinate measurement machine probe control module operatively coupled to a coordinate measurement machine controller, wherein the coordinate measurement machine comprises a contact probe, and wherein the portable coordinate measurement machine is operatively coupled to the control unit between the coordinate measurement machine probe control module operatively and the coordinate measurement machine controller.

18. The system of claim 14, wherein the control unit comprises a coordinate measurement machine probe control module operatively coupled to a coordinate measurement machine controller, wherein the portable coordinate measurement machine comprises a contact probe, and wherein the portable coordinate measurement machine is operatively coupled to the control unit between the coordinate measurement machine probe control module and a probe of the coordinate measurement machine.

19. A contact probe for a coordinate measurement machine comprising;
a plate;
a first spherical portion extending from the plate;
a second spherical portion extending from the plate;
a third spherical portion extending from the plate;
wherein the first, second, and third spherical portions are positioned to form a seat on the plate; and
wherein the first, second, and third spherical portions are electrically coupled to one another such that simultaneous contact of the first, second, and third spherical portions completes a segment of an electrical circuit.

20. The contact probe of claim 19, further comprising a switching circuit electrically coupling the first, second, and third spherical portions to one another.

* * * * *